(12) United States Patent
Tee et al.

(10) Patent No.: US 9,490,045 B2
(45) Date of Patent: Nov. 8, 2016

(54) SELF-HEALING COMPOSITES AND APPLICATIONS THEREOF

(71) Applicant: The Board of Trustees of the Leland Stanford Junior University, Stanford, CA (US)

(72) Inventors: Chee Keong Tee, Stanford, CA (US); Chao Wang, Stanford, CA (US); Hui Wu, Mountain View, CA (US); Yi Cui, Stanford, CA (US); Zhenan Bao, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 362 days.

(21) Appl. No.: 14/075,841

(22) Filed: Nov. 8, 2013

(65) Prior Publication Data
US 2016/0049217 A1    Feb. 18, 2016

Related U.S. Application Data

(60) Provisional application No. 61/724,838, filed on Nov. 9, 2012.

(51) Int. Cl.
| | | |
|---|---|---|
| *H01M 4/62* | (2006.01) | |
| *H01B 1/22* | (2006.01) | |
| *H01M 10/0525* | (2010.01) | |
| *G01L 1/18* | (2006.01) | |

(52) U.S. Cl.
CPC . *H01B 1/22* (2013.01); *G01L 1/18* (2013.01); *H01M 4/622* (2013.01); *H01M 10/0525* (2013.01); *H01M 4/624* (2013.01)

(58) Field of Classification Search
CPC ...... H01M 4/622; H01M 4/624; H01M 4/00; H01M 10/0525; H01B 1/22; G01L 1/18
See application file for complete search history.

(56) References Cited

U.S. PATENT DOCUMENTS

| | | |
|---|---|---|
| 4,317,874 A | 3/1982 | Joshi et al. |
| RE34,523 E | 1/1994 | Daude et al. |
| 5,425,762 A | 6/1995 | Muller |
| 5,798,409 A | 8/1998 | Ho |
| 6,030,421 A | 2/2000 | Gauthier et al. |
| 6,783,709 B2 | 8/2004 | Harreld et al. |
| 7,678,484 B2 | 3/2010 | Tao et al. |
| 7,780,745 B2 | 8/2010 | Silverman |

(Continued)

FOREIGN PATENT DOCUMENTS

WO    WO-2012/065213    5/2012

OTHER PUBLICATIONS

"Toward Conductive, Self-Healing Materials", Christopher W. Bielawski, Proceedings of the First International Conference on Self-Healing Materials, Apr. 18, 2007.*

(Continued)

*Primary Examiner* — Kenneth Douyette
(74) *Attorney, Agent, or Firm* — Foley & Lardner LLP; Cliff Z. Liu

(57) ABSTRACT

A battery electrode includes an electrochemically active material and a binder covering the electrochemically active material. The binder includes a self-healing polymer and conductive additives dispersed in the self-healing polymer to provide an electrical pathway across at least a portion of the binder.

20 Claims, 33 Drawing Sheets

(56) References Cited

U.S. PATENT DOCUMENTS

| | | | |
|---|---|---|---|
| 2004/0007784 A1* | 1/2004 | Skipor | B01J 13/02 |
| | | | 257/788 |
| 2008/0287638 A1 | 11/2008 | Reynolds et al. | |
| 2009/0015272 A1 | 1/2009 | Jones et al. | |
| 2009/0305135 A1* | 12/2009 | Shi | B82Y 30/00 |
| | | | 429/217 |
| 2010/0062338 A1 | 3/2010 | Golightly et al. | |
| 2011/0136017 A1 | 6/2011 | Singh et al. | |
| 2012/0088155 A1 | 4/2012 | Yushin et al. | |
| 2012/0165432 A1 | 6/2012 | Bateman et al. | |
| 2012/0208895 A1* | 8/2012 | Vittoria | A61K 6/08 |
| | | | 514/772.3 |
| 2012/0244390 A1 | 9/2012 | Cheng et al. | |
| 2012/0244391 A1 | 9/2012 | Yushin et al. | |
| 2012/0251886 A1 | 10/2012 | Yushin et al. | |
| 2013/0069601 A1 | 3/2013 | Coowar et al. | |

OTHER PUBLICATIONS

"Self-Healing Polymers", Encyclopedia of Polymer Science and Technology, 2010, p. 1-33.*

Cordier, Philippe et al., "Self-healing and thermoreversible rubber from supramolecular assembly," Nature Letters, (Feb. 21, 2008), vol. 451, pp. 977-980.

International Search Report and Written Opinion of the International Searching Authority for Application No. PCT/US2013/069326 mailed Aug. 28, 2014, 13 pages.

Mauldin, T.C. et al., "Self-healing polymers and composites," International Materials Reviews, (2010), vol. 55, No. 6, pp. 317-346.

Montarnal, Damien et al., "Versatile One-Pot Synthesis of Supramolecular Plastics and Self-Healing Rubbers," J. Am. Chem. Soc., (2009), vol. 131, pp. 7966-7967.

* cited by examiner

SELF-HEALING COMPOSITES AND APPLICATIONS THEREOF

CROSS-REFERENCE TO RELATED APPLICATION

This application claims the benefit of U.S. Provisional Application Ser. No. 61/724,838 filed on Nov. 9, 2012, the disclosure of which is incorporated herein by reference in its entirety.

STATEMENT REGARDING FEDERALLY SPONSORED RESEARCH OR DEVELOPMENT

This invention was made with Government support under contract FA9550-12-1-0190 awarded by the Air Force Office of Scientific Research and under contracts DE-AC02-765F00515 and DE-AC02-05CH11231 awarded by the Department of Energy. The Government has certain rights in the invention.

FIELD OF THE INVENTION

This disclosure generally relates to self-healing materials and, more particularly, to self-healing composites and applications of such composites.

BACKGROUND

When faced with the dilemma of mechanical fractures in biological systems, nature offers a smart solution: self-healing. Soft biomaterials, such as human skin, have the ability to self-heal or self-repair when damaged. After wounds heal, the skin is able to retain sensing functionalities. The ability to self-heal after mechanical damage has significantly enhanced the lifetime of biomaterials. In a similar vein, synthetic self-healing polymers would be able to repair themselves and recover functionalities despite being subjected to mechanical damage. Such self-healing polymers would find use in applications ranging from functional surfaces, electrical conductors, and electronic skin to provide enhanced lifetime and durability.

It is against this background that a need arose to develop the self-healing polymers and composites described herein.

SUMMARY

One aspect of this disclosure relates to a battery electrode. In one embodiment, the battery electrode includes an electrochemically active material and a binder covering the electrochemically active material and including a self-healing polymer.

Another aspect of this disclosure relates to a self-healing composite. In one embodiment, the self-healing composite includes a polymeric matrix formed of molecules cross-linked through reversible bonds and conductive additives dispersed in the matrix. The self-healing composite has an electrical conductivity of at least 1 S/cm.

A further aspect of this disclosure relates to a piezoresistive sensor. In one embodiment, the piezoresistive sensor includes a self-healing polymer including a matrix formed of molecules cross-linked through reversible bonds having a bonding strength in the range of 4 kJ/mol to 100 kJ/mol. The piezoresistive sensor also includes conductive additives dispersed in the self-healing polymer at a loading level below an electric percolation threshold.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Self-Healing Composites

Figure 1:
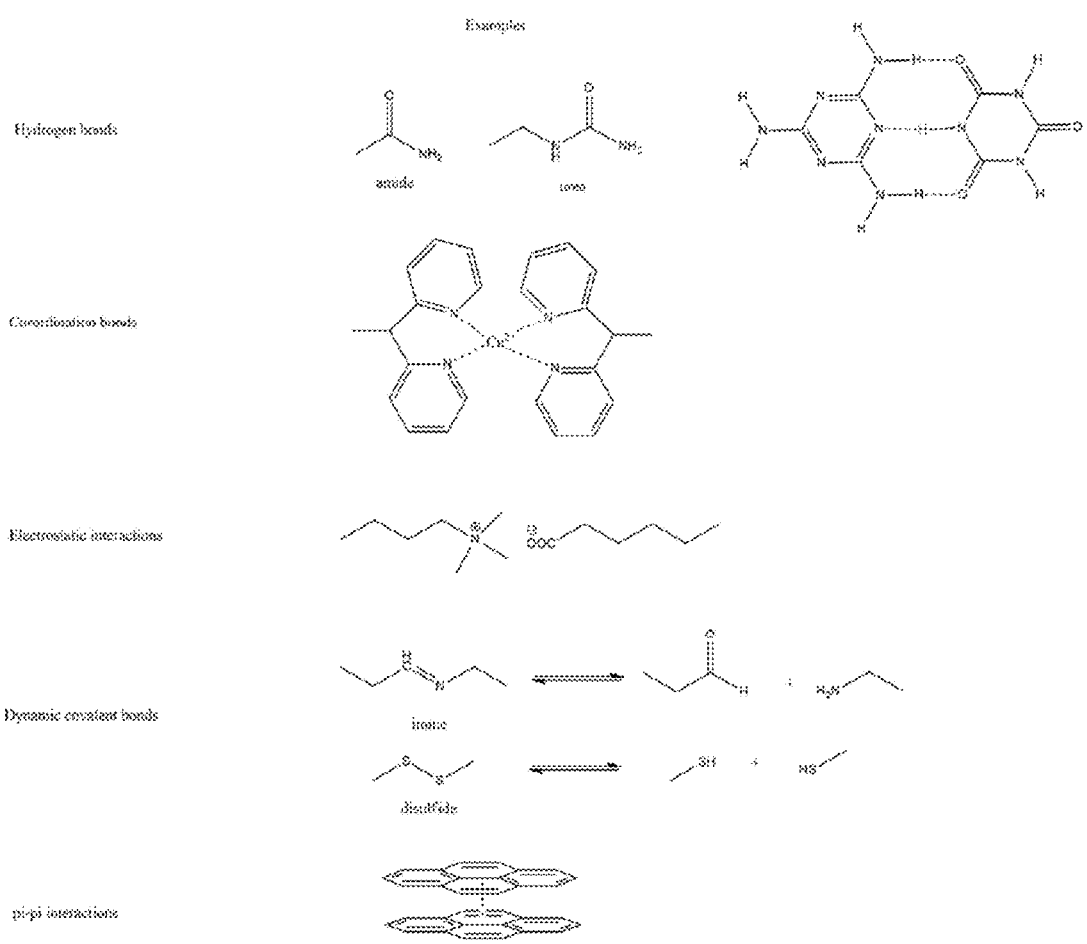
FIG. 1. Examples of associative groups and reversible bonds through which molecules can interact to form a cross-linked matrix.

Embodiments of this disclosure relate to self-healing polymers and self-healing composites formed of such self-healing polymers. In some embodiments, a self-healing composite includes a cross-linked polymeric matrix and conductive additives dispersed in the matrix. Upon damage of the composite, the composite self-heals without the need to apply external stimuli or the use of chemical agents to promote self-healing and damage repair. Advantageously, some embodiments of the composite can demonstrate repeatable, electrical and mechanical self-healing under ambient conditions, such as at or around room temperature.

A self-healing polymer of some embodiments includes a cross-linked polymeric matrix that is formed from molecules including associative groups. In forming the matrix, the molecules interact with one another through their associative groups to form an one-dimensional, a two-dimensional, or a three-dimensional polymeric network. An associative group of one molecule interacts with an associative group of another molecule to provide intermolecular bonds or links between the molecules. An associative group of one molecule also can interact with multiple other associative groups, such as associative groups of two or more molecules to provide intermolecular bonds or links between three or more molecules. In some embodiments, the resulting polymeric network can be referred to as a supramolecular polymeric network that is held together by bonds between associative groups.

In a cross-linked matrix of some embodiments, molecules interacts with one another (through their associative groups) by reversible, relatively weak bonds, such as non-covalent bonds. Accordingly, the cross-linked matrix is predominately held together by non-covalent bonds. In some embodiments, the non-covalent bonds between molecules can be hydrogen bonds. However, it is contemplated that other types of reversible, relatively weak bonds, such as coordination bonds or electrostatic interactions, can occur in addition to, or in place of, hydrogen bonds. More generally, suitable reversible, weak bonds include those having a bonding strength in the range of about 4 kJ/mol to about 100 kJ/mol, such as from about 4 kJ/mol to about 50 kJ/mol, from about 10 kJ/mol to about 50 kJ/mol, from about 10 kJ/mol to about 30 kJ/mol, from about 30 kJ/mol to about 50 kJ/mol, from about 50 kJ/mol to about 100 kJ/mol, from about 50 kJ/mol to about 70 kJ/mol, or from about 70 kJ/mol to about 100 kJ/mol. Molecules forming a cross-linked matrix also can interact with conductive additives through their associative groups by forming reversible, weak bonds, such as hydrogen bonds.

By cross-linking through reversible, weak bonds, a supramolecular polymeric network provides a self-healing function via these weak bonds, which break preferentially (instead of stronger covalent bonds) during a mechanical damage event. These 'broken' bonds can dynamically associate and dissociate to provide a healing mechanism at a damaged site. Additionally, a low glass transition temperature (Tg) allows polymer chains near a damaged site to rearrange, approach, wet, and diffuse, thereby allowing healing under ambient temperatures. Tg of a self-healing polymer can be adjusted according to a number or a density of associative groups, thereby controlling an extent of cross-linking. In some embodiments, Tg of a self-healing polymer (as measured in the absence of conductive additives) can be no greater than about 25° C., such as from about −100° C. to about 25° C., from about −100° C. to about −50° C., from about −50° C. to about 25° C., from about −50° C. to about 0° C., or from about 0° C. to about 25° C. In some embodiments, Tg of a self-healing polymer (as measured in the absence of conductive additives) can be no greater than about 50° C., such as from about −100° C. to about 50° C., from about −100° C. to about −50° C., from about −50° C. to about 50° C., from about −50° C. to about 0° C., or from about 0° C. to about 50° C. In some embodiments, Tg of a self-healing polymer (as measured in the absence of conductive additives) can be no greater than about 75° C., such as from about −100° C. to about 75° C., from about −100° C. to about −50° C., from about −50° C. to about 75° C., from about −50° C. to about 0° C., or from about 0° C. to about 75° C. In some embodiments, Tg of a self-healing composite (as measured in the presence of conductive additives that are dispersed in a self-healing polymer) can be somewhat higher relative to that of the self-healing polymer alone, although the above listed ranges of temperatures remain generally applicable. Depending on the particular application, it is also contemplated that Tg of self-healing polymers and composites above about 75° C. can be suitable.

FIG. 1 presents examples of associative groups and reversible bonds through which molecules can interact to form a cross-linked matrix. Specifically, FIG. 1 shows (a) hydrogen bonds between hydrogen donating groups and hydrogen accepting groups, (b) coordination bonds between cationic species, such as metal cations, and electron donating groups, (c) electrostatic interactions between cationic groups and anionic groups, (d) dynamic covalent bonds, such as the reversible formation of imine bonds and disulfide bonds, and (e) π-π interactions, such as between polycyclic aromatic groups or other π-π stacking interactions. Other examples of reversible bonds include host-guest interactions, charge transfer interactions, and van der Waals interactions. It should be noted that the associative groups shown in FIG. 1 are provided by way of example, and various other associative groups that are able to form reversible, relatively weak bonds are encompassed by this disclosure.

Molecules forming a cross-linked matrix typically include multiple associative groups per molecule. Each molecule can include at least two associate groups and can include three, four, five, or more associative groups. The associative groups can be included in a backbone of the molecule, or can be pendant or terminal groups attached to the backbone. For example, a molecule including two associative groups can be referred to as a ditopic or bidentate molecule, and each such ditopic molecule can associate with two other ditopic molecules to form a chain-like network. By including a mixture of ditopic and multitopic (or multidentate) molecules, a three-dimensional polymeric network can be formed.

In the case of hydrogen bonds, associative groups including a hydrogen atom bonded to an electronegative atom, such as nitrogen or oxygen, can serve as hydrogen donating groups, while associative groups including an atom with a lone pair of electrons can serve as hydrogen accepting groups. The interaction between a hydrogen donating group and a hydrogen accepting group results in the formation of a hydrogen bond.

In some embodiments, associative groups of molecules can be selected from halogen, oxygen, and nitrogen-containing functional groups. In some embodiments, associative groups can be selected from hydroxyl, amine, and carbonyl-containing functional groups. Associative groups of a molecule can be of the same type, or can be a combination of different types. In some embodiments, associative groups of molecules can be carbonyl-containing functional groups. Carbonyl-containing functional groups include the moiety C=O. Examples of carbonyl-containing functional groups include amide, ester, urea, and carboxylic acid functional groups. The C=O moiety of carbonyl-containing functional groups can serve as hydrogen acceptors for the formation of hydrogen bonds, as the oxygen atom of the carbonyl group includes a lone pair of electrons. In some embodiments, associative groups of molecules can be selected from amine, amide, and urea functional groups. Amine, amide, and urea functional groups include the moiety —NHR, where R can be hydrogen or a moiety different from hydrogen. The —NHR moiety can serve as a hydrogen donor in the formation of hydrogen bonds, as it includes a hydrogen atom bonded to an electronegative nitrogen atom. It should be noted that the same type of associative group can serve as both a hydrogen acceptor and a hydrogen donor. For example, amide and urea functional groups include the C=O moiety, which can serve as a hydrogen acceptor, as well as the —NHR moiety, which can serve as a hydrogen donor.

In general, a cross-linked matrix can be formed of any type of molecule including suitable associative groups. In some embodiments, the cross-linked matrix can be formed of one type of molecule. In other embodiments, the cross-linked matrix can be formed of a mixture of two or more different types of molecules. Molecules can be prepared synthetically, or can be derived from natural sources. In some embodiments, molecules can be macromolecules that are oligomeric or polymeric. Oligomers and polymers are typically formed from polymerization of one or more types of monomers. Oligomers typically include fewer monomer units than polymers and, therefore, are typically of lower molecular weight. As an example, oligomers can include from 2 to 10 monomer units, while polymers can include more than 10 monomer units. Synthetically prepared molecules can be formed using a number of different techniques, such as free radical, ionic, ring opening, allyl addition or condensation polymerization techniques. Molecules also can be formed using synthetic techniques, such as Diels-Alder or click chemistry techniques.

In some embodiments, desirable molecules include those having sufficient flexibility to allow molecules near a damaged site to rearrange, approach, and bring their associative groups into close proximity, thereby allowing bonding between the associative groups and self-healing. For example, a desirable molecule can include a saturated hydrocarbon moiety, such as an alkylene moiety (e.g., an alkylene straight chain in the form of —$(CH_2)_n$— with n in the range of 1 to 40, 1 to 20, or 1 to 10, as well as other $C_{1-40}$, $C_{1-20}$, and $C_{1-10}$ alkylene moieties), or a flexible oligomeric or polymeric chain, such as a polyamide, polyester, polyurethane, or polysiloxane chain. A desirable molecule also can include a flexible portion attached to a relatively inflexible portion, such as an unsaturated hydrocarbon moiety or a cyclic moiety, provided the flexible portion imparts sufficient flexibility for self-healing. For example, some embodiments utilize a self-healing polymer that is itself conductive, such that conductive additives can be optionally omitted. The self-healing polymer can be electrically conductive or semiconducting under ambient conditions, or can become electrically conductive or semiconducting during operation (e.g., during charging or discharging of a battery). In the case of battery applications, for example, the self-healing polymer can become conductive upon charging (e.g., the polymer is oxidized to become conductive if used as a cathode, or is reduced to become conductive if used as an anode). In embodiments utilizing a conductive, self-healing polymer, the constituent molecules can include unsaturated, conjugated moieties, such as oligomeric or polymeric chains corresponding to polyacetylene, polyphenylene vinylene, polypyrrole, polythiophene, polyaniline, polyphenylene sulfide, and other conductive polymers.

Figure 2:
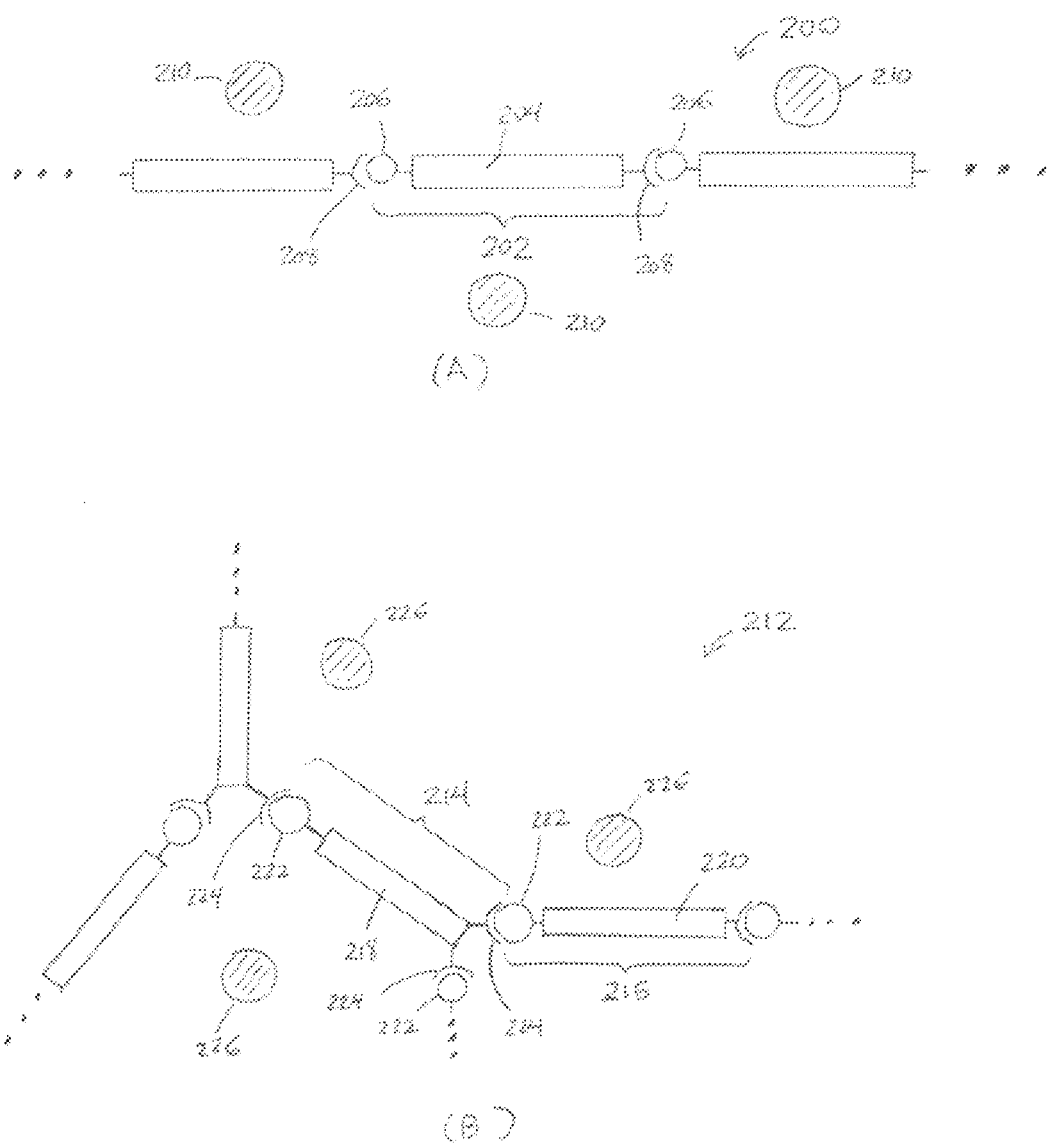
FIGS. 2. (A), (B), (C), and (D): Schematics of example self-healing composites formed of molecules that interact through their associative groups to form cross-linked matrices.
Figure 2:
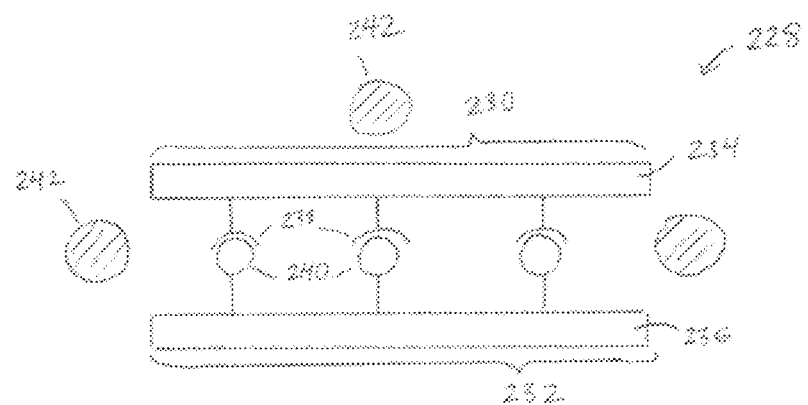
Figure 2:
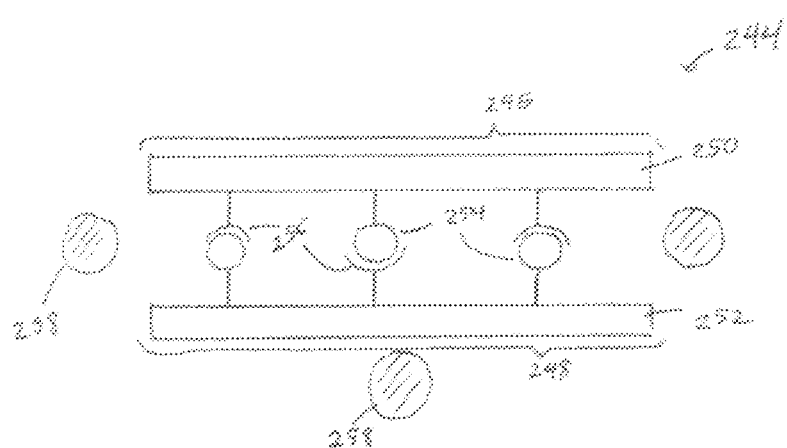

FIG. 2 presents schematics of example self-healing composites formed of molecules that interact through their associative groups to form cross-linked matrices.

Specifically, FIG. 2A shows a cross-linked matrix 200 formed of ditopic molecules 202. Each ditopic molecule 202 includes associative groups 206 and 208, which are attached to a connecting moiety 204 as terminal groups. The ditopic molecules 202 interact (e.g., directly interact without an intervening cross-linking agent) through complementary pairs of the associative groups 206 and 208 to form a chain-like network. At least a portion of the connecting moiety 204 is sufficiently flexible to allow dynamic re-association of the associative groups 206 and 208 and self-healing. Conductive additives 210 are dispersed in the cross-linked matrix 200, which serves as a host for the conductive additives 210.

FIG. 2B shows a cross-linked matrix 212 formed of a mixture of tritopic molecules 214 and ditopic molecules 216. Higher order multitopic molecules also can be included in the mixture. The tritopic molecules 214 and the ditopic molecules 216 interact (e.g., directly interact without an intervening cross-linking agent) through complementary pairs of associative groups 222 and 224 to form a three-dimensional network. At least portions of connecting moieties 218 and 220 of the tritopic molecules 214 and ditopic molecules 216 are sufficiently flexible to allow dynamic re-association of the associative groups 222 and 224 and self-healing. Conductive additives 226 are dispersed in the cross-linked matrix 212, which serves as a host for the conductive additives 226.

FIG. 2C shows a cross-linked matrix 228 formed of a mixture of multitopic molecules 230 and 232. Each multitopic molecule 230 includes associative groups 238, which are attached to a connecting moiety 234 as pendant groups, and each multitopic molecule 232 includes associative groups 240, which are attached to a connecting moiety 236 as pendant groups. The multitopic molecules 230 and 232 interact (e.g., directly interact without an intervening cross-linking agent) through complementary pairs of the associative groups 238 and 240 to form a two-dimensional or a three-dimensional network. At least portions of the connecting moieties 234 and 236 are sufficiently flexible to allow dynamic re-association of the associative groups 238 and 240 and self-healing. Conductive additives 242 are dispersed in the cross-linked matrix 228, which serves as a host for the conductive additives 242.

Similar to FIG. 2C, FIG. 2D shows a cross-linked matrix 244 formed of multitopic molecules 246 and 248. Each multitopic molecule 246 or 248 includes different types of associative groups, namely associative groups 254 and 256, which are attached to a connecting moiety 250 or 252 as pendant groups. The multitopic molecules 246 and 248 interact (e.g., directly interact without an intervening cross-linking agent) through complementary pairs of the associative groups 254 and 256 to form a two-dimensional or a three-dimensional network. At least portions of the connecting moieties 250 and 252 are sufficiently flexible to allow dynamic re-association of the associative groups 254 and 256 and self-healing. Conductive additives 258 are dispersed in the cross-linked matrix 244, which serves as a host for the conductive additives 258.

As explained above, a self-healing composite of some embodiments of this disclosure includes conductive additives dispersed in a cross-linked matrix. Desirably, the conductive additives are compatible with, and amenable to being substantially homogeneously dispersed in, the cross-linked matrix of the composite. In some embodiments, little or no phase separation of the conductive additives from the cross-linked matrix should be observed. Depending on the particular application, a single type of conductive additive can be included, or two or more different types of conductive additives can be included. In other embodiments, a self-healing polymer is itself conductive, such that conductive additives can be optionally omitted. In embodiments utilizing a conductive, self-healing polymer, conductive additives also can be included to further enhance conductivity.

Conductive additives can include conductive microstructures, conductive nanostructures, and combinations of conductive microstructures and conductive nanostructures. To impart electrical conductivity, conductive additives can be formed of a material that is electrically conductive or semiconducting, or can be a heterostructure formed of a combination of materials having a combination of characteristics, such as in a core-shell or multi-layered configuration. The inclusion of conductive additives also can impart desirable mechanical properties to a resulting composite, such as in terms of improvement in strength. For example, conductive additives can be formed of a metal, a metal alloy, a metal silicide, a metal nitride, a metal sulfide, a metal carbide, a semiconductor, an electrically conductive polymer, a doped form of a metal oxide, or a combination of such materials, and, more particularly, conductive additives can be formed of copper, gold, nickel, palladium, platinum, silver, zinc, aluminum, titanium, iron, stainless steel, carbon, or another Group 14 element (e.g., silicon or germanium), a Group 14-14 binary alloy (e.g., silicon carbide), a Group 12-16 binary alloy (e.g., zinc oxide), a Group 13-15 binary alloy (e.g., aluminum nitride), or another binary, ternary, quaternary, or higher order alloy of Group 11 elements, Group 12 elements, Group 13 elements, Group 14 elements, Group 15 elements, Group 16 elements, and Group 17 elements.

Conductive additives can have any of a variety of shapes, such as spheroidal, spherical, tetrahedral, tripodal, disk-shaped, pyramid-shaped, box-shaped, cube-shaped, cylindrical, tubular, wire-shaped, branch-shaped, and a number of other geometric and non-geometric shapes. Examples of conductive additives include carbon black; fullerenes; graphene; copper nanowires, microwires, nanoparticles, or microparticles; nickel nanowires, microwires, nanoparticles, or microparticles; silver nanowires, microwires, nanoparticles, or microparticles; germanium nanowires, microwires, nanoparticles, or microparticles; silicon nanowires, microwires, nanoparticles, or microparticles; silicide nanowires, microwires, nanoparticles, or microparticles; metal carbide nanowires, microwires, nanoparticles, or microparticles; zinc oxide nanowires, microwires, nanoparticles, or microparticles; copper oxide nanowires, microwires, nanoparticles, or microparticles; iron oxide nanowires, microwires, nanoparticles, or microparticles; carbon nanotubes or microtubes (e.g., single-walled carbon nanotubes and multi-walled carbon nanotubes), and core-shell nanowires or microwires (e.g., a shell formed of copper, nickel, or silver surrounding a core formed of another material).

In some embodiments, at least a subset of conductive additives have surface texturing, such as in the form of asperities, corrugations, peaks, spikes, or other surface roughness. The use of conductive additives having surface texturing can increase the occurrence of junction formation between neighboring conductive additives at a reduced loading level of the conductive additives, and can form an efficient charge transport pathway by reducing the number of hopping or tunneling events. Surface texturing of conductive additives also can promote wetting of the conductive additives, and improve dispersion of the conductive additives in a polymeric matrix. The presence of surface texturing can be characterized by, for example, an increase in specific surface area relative to corresponding conductive additives (of the same or similar size and shape, and formed of the same or similar material) without such surface texturing, such as an increase in specific surface area of at least about 1%, at least about 2%, at least about 5%, at least about 10%, at least about 15%, at least about 20%, or at least about 30%, and up to about 50%, up to about 70%, or more. In some embodiments, at least a subset of conductive additives corresponds to high aspect ratio nanostructures or microstructures, such as nanotubes, nanowires, microtubes, or microwires. Similar to the use of surface texturing, the use of high aspect ratio conductive additives can increase the occurrence of junction formation at a reduced loading level of the conductive additives, and can form an efficient charge transport pathway.

In some embodiments, conductive additives can be included in a self-healing composite at a volume loading level in the range of about 0.5% to about 50% by volume of the composite, such as from about 0.5% to about 15%, from about 5% to about 15%, from about 10% to about 15%, from about 15% to about 50%, from about 15% to about 30%, from about 20% to about 30%, from about 30% to about 40%, or from about 30% to about 50%. In some embodiments, conductive additives can be included in a self-healing composite at a weight loading level in the range of about 0.5% to about 90% by weight of the composite, such as from about 0.5% to about 35%, from about 5% to about 35%, from about 10% to about 35%, from about 35% to about 90%, from about 35% to about 70%, from about 50% to about 70%, or from about 35% to about 50%. Higher loading levels of conductive additives, such as at or above an electrical percolation threshold, can be included for applications in which electrical conductivity is desired. Lower loading levels of conductive additives, such as below or just below an electrical percolation threshold, can be included for other applications, such as loading levels of at least about 80%, at least about 85%, at least about 90%, at least about 95%, at least about 98%, or at least about 99% of the electrical percolation threshold, but less than 100% of the electrical percolation threshold. For example, using lower loading levels, with conductive additives spaced further apart, self-healing piezoresistive sensors can be realized. The larger spacing between conductive additives allows a more significant change in resistance as compressive, flexion, or other mechanical forces bring the conductive additives closer together within a polymeric matrix.

In some embodiments, conductive additives can be included in a self-healing composite, such that a spacing between neighboring conductive additives is, on average, no greater than about 500 µm, no greater than about 100 µm, no greater than about 50 µm, no greater than about 40 µm, no greater than about 30 µm, no greater than about 20 µm, no greater than about 10 µm, no greater than about 5 µm, or no greater than about 1 µm, and down to about 500 nm, down to about 400 nm, down to about 300 nm, down to about 200 nm, down to about 100 nm, down to about 50 nm, or less. In some embodiments, a cross-linked polymeric matrix can wrap around conductive additives dispersed in the matrix and bring the conductive additives closer together within the matrix.

Neighboring conductive additives dispersed in a self-healing composite can be physically or electrically connected with one another to form a charge transport pathway at least partially or substantially fully extending across a width of the composite, a length of the composite, a thickness of the composite, or across any combination or sub-combination of the width, the length, and the thickness of the composite. For example, the charge transport pathway formed by the interconnected conductive additives can extend across at least about 10% of the width of the composite, such as at least about 20%, at least about 30%, at least about 40%, at least about 50%, at least about 60%, at least about 70%, at least about 80%, at least about 90%, at least about 95%, at least about 98%, or about 100%. As another example, the charge transport pathway formed by the interconnected conductive additives can extend across at least about 10% of the length of the composite, such as at least about 20%, at least about 30%, at least about 40%, at least about 50%, at least about 60%, at least about 70%, at least about 80%, at least about 90%, at least about 95%, at least about 98%, or about 100%. As a further example, the charge transport pathway formed by the interconnected conductive additives can extend across at least about 10% of the thickness of the composite, such as at least about 20%, at least about 30%, at least about 40%, at least about 50%, at least about 60%, at least about 70%, at least about 80%, at least about 90%, at least about 95%, at least about 98%, or about 100%.

Self-healing composites of embodiments of this disclosure can exhibit a number of desirable properties. For example, a conductive healing efficiency, $\eta_{elec}$, can be specified as a proportion of electrical conductivity restored relative to an original conductivity, following a damage event such as a partial cut, and $\eta_{elec}$ can be at least about 5%, at least about 10%, at least about 20%, at least about 30%, at least about 40%, at least about 50%, at least about 60%, at least about 70%, at least about 80%, or at least about 90%, and up to about 95%, up to about 98%, up to about 99%, or more. Moreover, self-healing is repeatable, such that $\eta_{elec}$ can be maintained within the above-stated ranges following multiple damage events at the same location, such as following 2, 3, 4, 5, 10, or more damage events.

As another example, a mechanical healing efficiency, $\eta_{mech}$, can be specified as a proportion of toughness restored relative to an original toughness, following a damage event such as a partial cut, and $\eta_{mech}$ can be at least about 5%, at least about 10%, at least about 20%, at least about 30%, at least about 40%, at least about 50%, at least about 60%, at least about 70%, at least about 80%, or at least about 90%, and up to about 95%, up to about 98%, up to about 99%, or more. Moreover, self-healing is repeatable, such that $\eta_{mech}$ can be maintained within the above-stated ranges following multiple damage events at the same location, such as following 2, 3, 4, 5, 10, or more damage events.

As another example, self-healing can occur at moderate temperatures, such as at or around room temperature or in the range of about 0° C. to about 40° C., in the range of about 10° C. to about 30° C., or in the range of about 20° C. to about 30° C. In some embodiments, self-healing can be promoted under mild thermal treatment, such as in the range of about 40° C. to about 80° C., in the range of about 40° C. to about 70° C., or in the range of about 40° C. to about 60° C. A time period for self-healing can be no greater than about 20 hours, no greater than about 10 hours, no greater than about 5 hours, no greater than about 2 hours, no greater than about 1 hour, no greater than about 30 minutes, or no greater than about 10 minutes, and down to about 5 minutes, down to about 2 minutes, or less.

As another example, an electrical conductivity of self-healing composites can be at least about $10^{-3}$ S/cm, at least about $10^{-2}$ S/cm, at least about 0.1 S/cm, at least about 0.2 S/cm, at least about 0.25 S/cm, at least about 1 S/cm, at least about 5 S/cm, at least about 10 S/cm, at least about 15 S/cm, or at least about 20 S/cm, and up to about 30 S/cm, up to about 40 S/cm, or more.

As a further example, self-healing polymers and composites can exhibit desirable mechanical properties, including high stretchability. In terms of stretchability, for example, an elongation-at-break can be at least about 5%, at least about 10%, at least about 50%, at least about 100%, at least about 150%, at least about 200%, at least about 250%, or at least about 300%, and up to about 350%, up to about 400%, or more.

Applications of Self-Healing Composites

Self-healing composites described herein can be used in a number of applications ranging from functional surfaces, electrical conductors, piezoresistive sensors, electronic skin, and electrodes for batteries and other electrochemical energy storage devices.

For example, self-healing composites can be used as polymer binders in electrodes for a variety of batteries and other electrochemical energy storage devices. Certain electrochemically active materials can undergo large volumetric changes during cycling, which can cause cracking and pulverization in an electrode, and can lead to loss of electrical contact and excessive solid-electrolyte interphase growth. The use of self-healing composites as polymer binders in place of, or in combination with, conventional polymer binders can realize self-healing electrodes. Examples of electrochemically active materials include anode materials that alloy with lithium, such as silicon, tin, germanium, magnesium, and aluminum, as well as cathode materials such as sulfur-based cathode materials. More generally, electrochemically active materials can include a variety of other anode and cathode materials that undergo reversible insertion of ions during cycling. An electrochemically active material can be provided in the form of nanostructures, microstructures, or a combination of nanostructures and microstructures, and a self-healing composite can be provided as a coating covering the electrochemically active material, or can serve as a matrix within which the electrochemically active material is dispersed.

Figure 3:
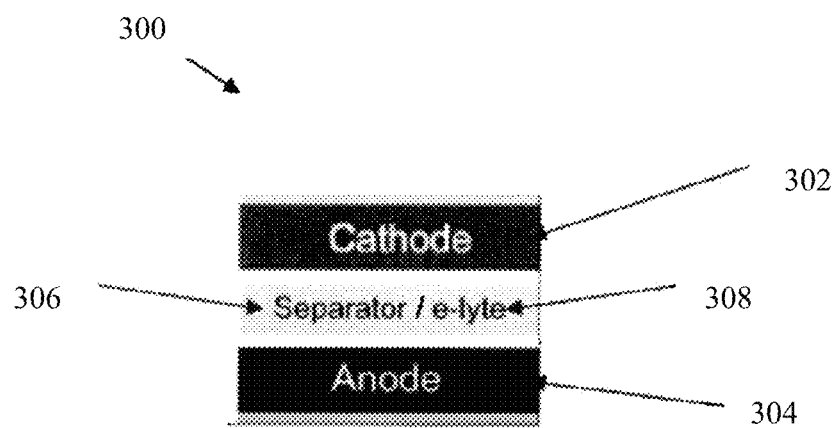
FIG. 3. Schematic of a battery including a self-healing electrode.

FIG. 3 shows a schematic of a battery 300, which includes a cathode 302, an anode 304, and a separator 306 that is disposed between the cathode 302 and the anode 304. The battery 300 also includes an electrolyte 308, which is disposed between the cathode 302 and the anode 304. Either, or both, of the cathode 302 and the anode 304 can be implemented as a self-healing electrode.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Stable Operation for Silicon Microparticle Anodes for High Energy Lithium-Ion Batteries Using Self-Healing Chemistry The ability to spontaneously repair damage, which is termed as self-healing, is an important survival feature in nature because it increases the lifetime of most living creatures. This feature is highly desirable for rechargeable batteries because the lifetime of high-capacity electrodes, such as silicon (Si) anodes, has been shortened by the mechanical fractures generated during the cycling process. In this example, self-healing chemistry is applied to silicon microparticle anodes to overcome their short cycle life. By coating Si anodes with a room temperature repeatable self-healing polymer, this example shows that the low-cost Si microparticles (about 2-7 µm), for which good cycling was previously not attained, can now have an excellent cycle life. This example demonstrates a cycle life of about 10 times longer than state-of-art anodes made from Si microparticles while retaining a high capacity (up to >about 3,000 mAh/g). Cracks and damage in the coating during cycling can be spontaneously healed due to the presence of the self-healing polymer rationally designed to have features, such as room-temperature reversible healing due to the hydrogen bonding chemistry, the amorphous structure, its low glass transition temperature, and the high stretchability.

Self-healing is particularly desirable for energy storage because the lifetime of many rechargeable batteries are limited by the dilemma of mechanical fractures over cycling process. Electrochemical reactions in battery materials normally result in structural changes, which may cause degradation, damage and ultimately cause the battery to be non-functional with cycling. Next-generation electrode materials for lithium (Li)-ion batteries are especially susceptible to these failure mechanisms because they react with greater amounts of Li and thus undergo more drastic structural changes. For example, Si, which has a theoretical specific capacity of about ten times higher than that of conventional graphite anodes, usually suffers from fast capacity decay and short cycle life. This is mainly because Si expands volumetrically by up to about 300% upon full lithium insertion (lithiation) and contracts significantly on lithium extraction (delithiation). These extreme volumetric changes can cause cracking and pulverization in the electrode, which lead to loss of electrical contact and excessive solid-electrolyte interphase (SEI) growth. Even when incorporating the Si materials with metal alloys or high-modulus polymer binders, mechanical fractures and damages can still occur.

One feasible approach to increase the lifetime of Si anodes is to use nano-scale Si material. However, Si nanoparticles (SiNPs) are typically available in small quantities, while other nanostructured Si materials, such as nanowires, nanospheres, nanotubes, and nanocrystals, can involve either, or both, chemical vapor deposition and template growth, both of which can be difficult and expensive to scale up. Therefore, Si microparticles (SiMPs) are more promising as electrode materials towards practical industrial applications because they are inexpensive and readily commercially available. In addition, the use of SiMPs leads to higher volumetric energy density when compared to SiNPs. However, previously reported SiMP anodes generally have extremely short cycle life: the capacity rapidly drops to about 50% of the initial value in less than 10 cycles due to the significant fracture and particle detachment in the electrodes. In this example, a chemical approach is used to improve the cycling lifetime by coating the microparticles with a thin layer of hydrogen-bond-directed self-healing polymer. Compared with traditional polymer binders, the self-healing chemistry is designed to provide spontaneous repair of the mechanical damages in the electrode and thus increases the lifetime of the Si microparticle anode.

Figure 4:
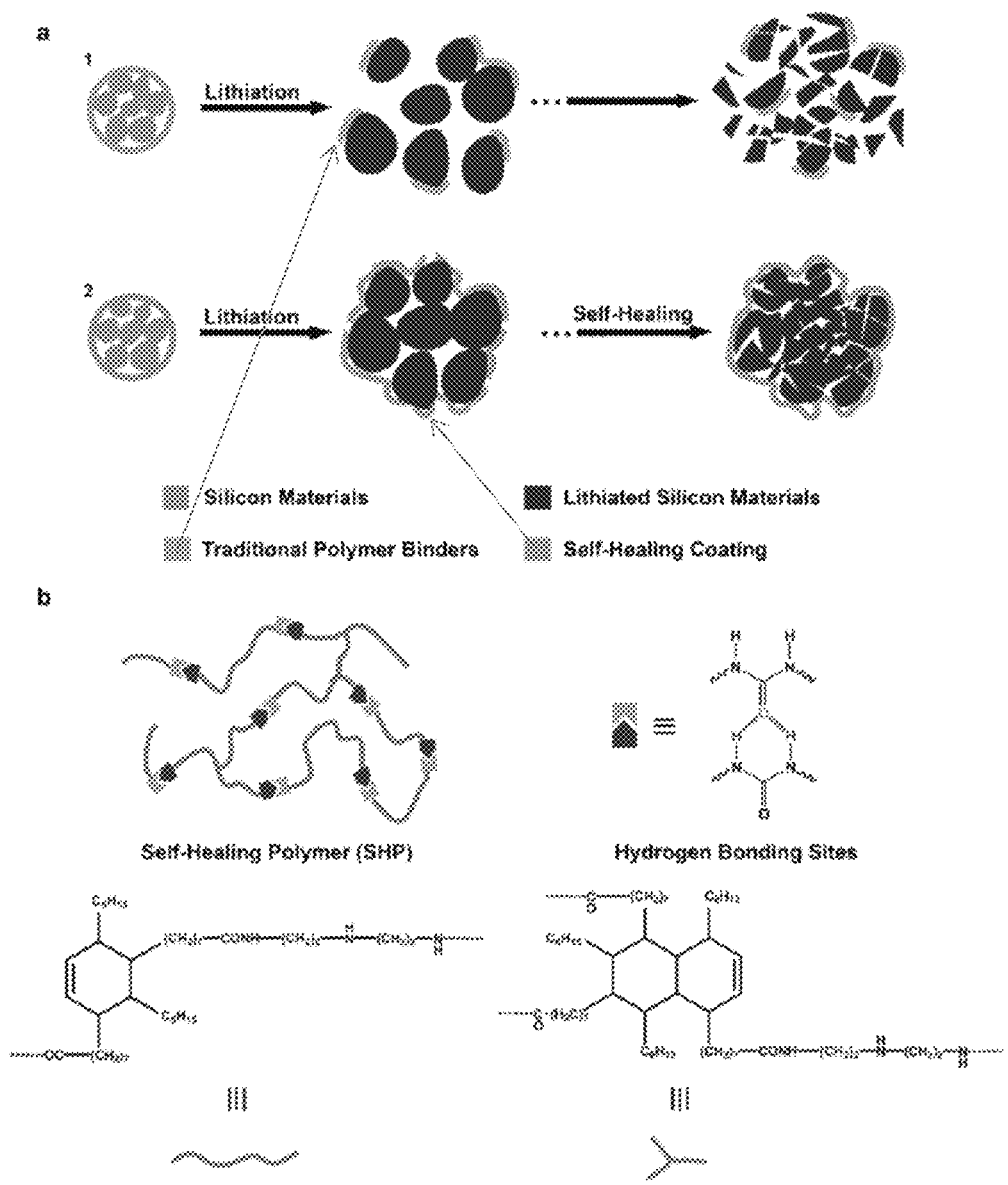
FIG. 4. Design and structure of a self-healing electrode. a, Scheme 1: schematic illustration of the design and behavior of a conventional silicon (Si) electrode, showing failure of the electrode due to cracking in particles and polymer binder resulting in loss of electrical contact. Scheme 2: schematic illustration of the design and behavior of a stretchable self-healing electrode, showing maintaining of electrical contact between the broken particles and absence of cracks in the polymer binder due to the stretchability and incorporation of self-healing chemistry. b, Chemical structure of the self-healing polymer (SHP). Lines: polymer backbones; light and dark boxes: hydrogen bonding sites.

FIG. 4a shows a schematic design of a self-healing electrode. In a traditional Si-based anode, a polymer binder surrounds Si particles and binds the active materials to a current collector to maintain electrical contact (FIG. 4a1). Upon cycling, the stress generated by the huge volumetric changes during the lithiation/delithiation of SiMPs causes fracture in the particles and polymer layers, resulting in loss of electrical contact and subsequent loss of capacity. In the design of this example (FIG. 4a2), the Si electrode is coated with a thin layer of a soft self-healing polymer. Different from conventional polymer binders, the self-healing polymer is stretchable and can spontaneously repair the mechanical damages and cracks in the electrode, resulting in more stable mechanical and electrical connections among the Si particles.

Figure 5:
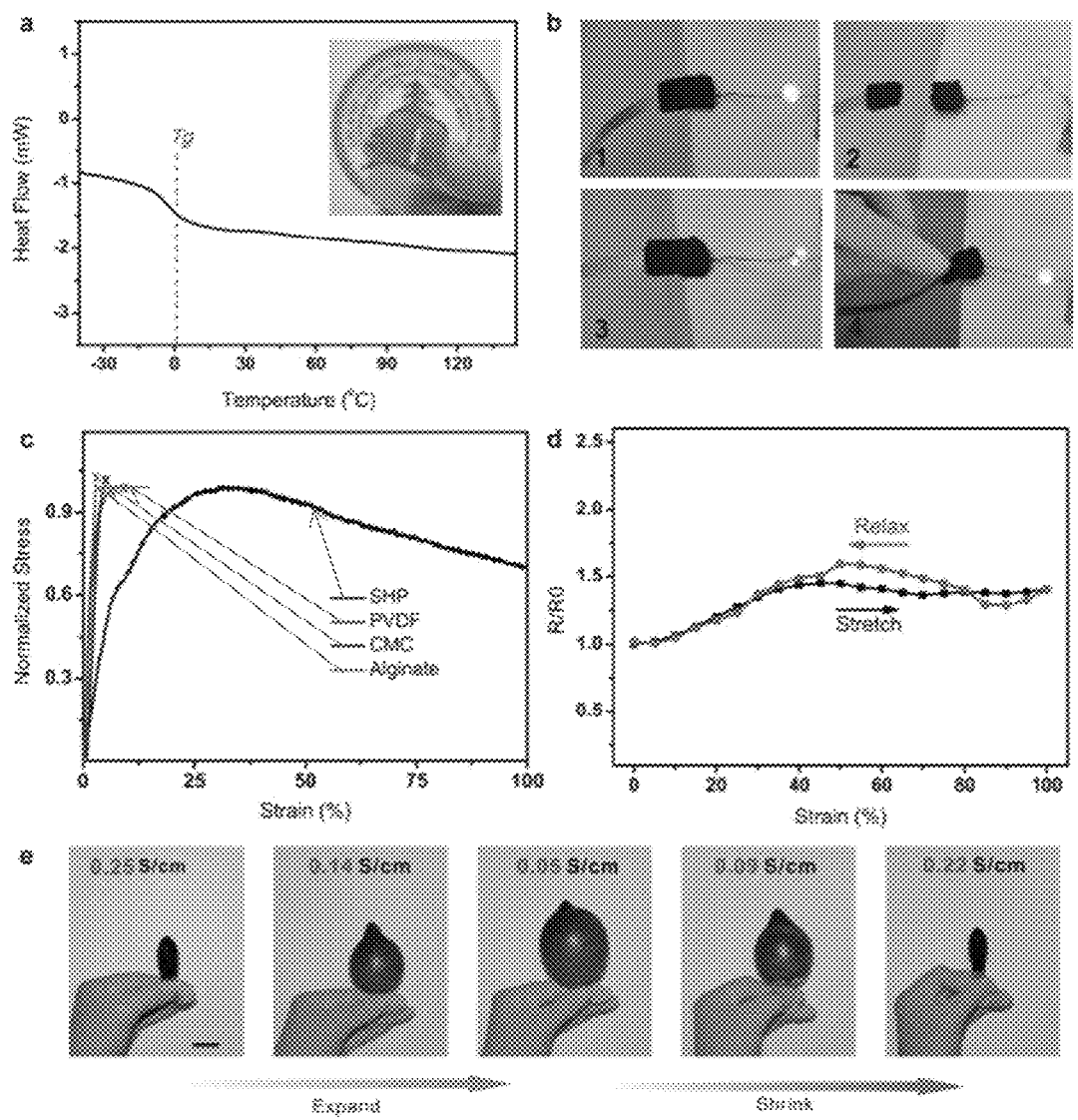
FIG. 5. Characterization of a self-healing composite material. a, Differential scanning calorimetry (DSC) curve of a SHP showing that the Tg of the SHP is about 0° C., much lower than room temperature. Inset, picture of the SHP. b, Demonstration of the electrical and mechanical self-healing capability of the conductive composite using a battery-powered circuit with the composite SHP as the conductive pathway connecting a light emitting diode (LED) to a battery. c, Tensile tests of the SHP and other conventional polymer binders, showing that the SHP exhibits much higher stretchability than conventional polymer binders. d, The ratio between the resistance (R) and initial resistance (R0) at different strain, showing that the SHP/carbon black (CB) composite remains conductive over the entire stretching cycle. e, Coating the SHP/CB composite material onto an inflatable balloon to mimic the volumetric changes of silicon particles over cycling process. The changes in its electrical conductivity during the balloon's repeated cycles of inflation and deflation were monitored. The SHP/CB coating remains conductive over the entire expand/shrink process. Scale bar: 2 cm.
Figure 10:
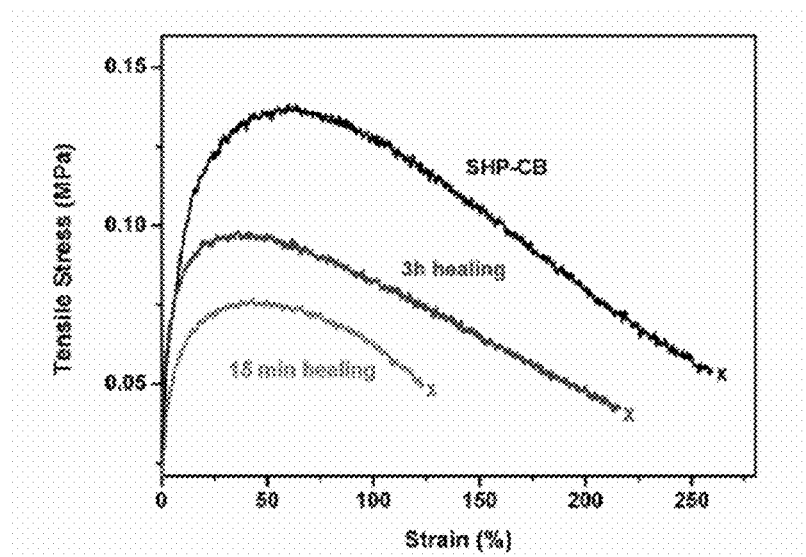
FIG. 10. Tensile tests of SHP/CB composites after different healing times.
Figure 11:
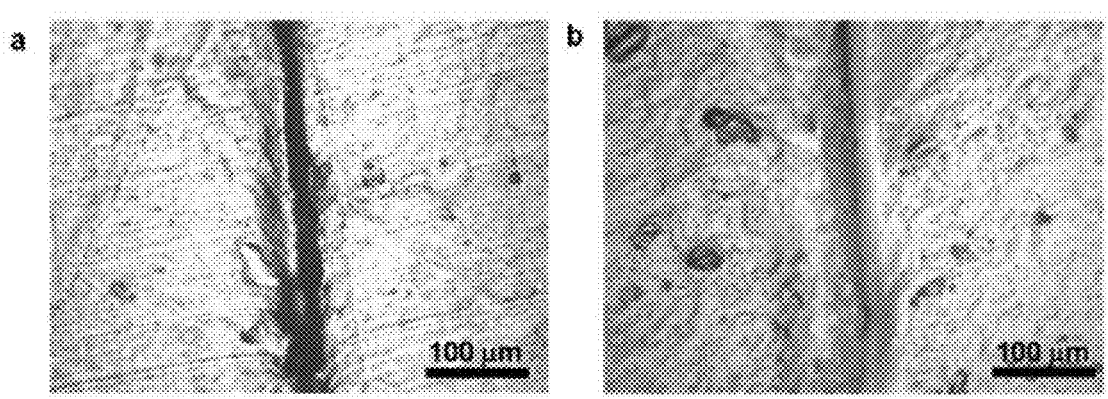
FIG. 11. Optical images of a crack on a SHP/CB sample. a, before healing and b, after healing for about 20 h.
Figure 12:
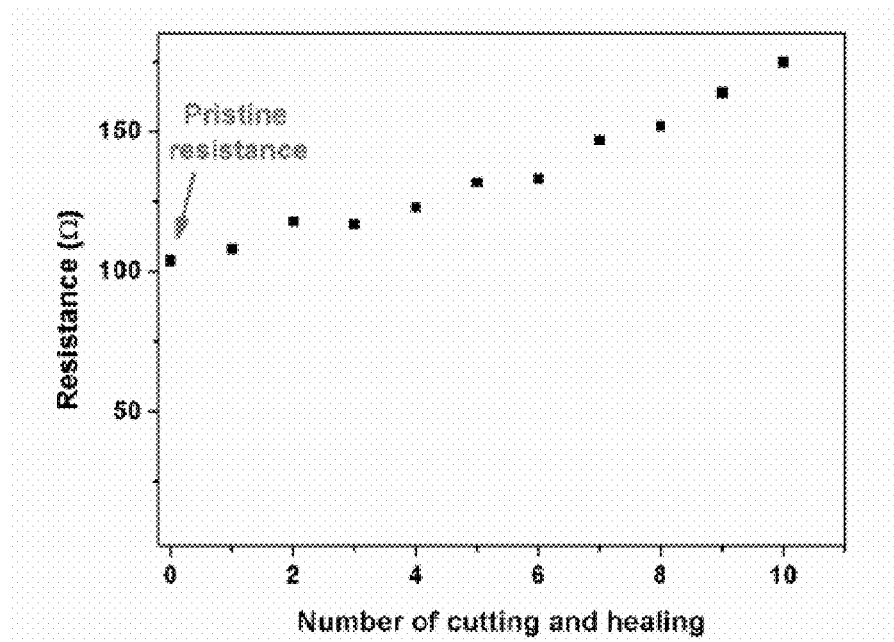
FIG. 12. Resistance of samples upon multiple cutting and healing at the same damage location. Healing time is about 3 min.

Two categories of self-healing polymers include: (i) polymers with dynamic bonds and (ii) polymers embedded with microencapsulated healing agents. For battery applications, dynamic bonding-based self-healing polymer is more desirable due to its repeatable healing capability. Particularly, a hydrogen-bonding-directed self-healing polymer is advantageous as the coating layer because it allows for the cracks to heal autonomously and repeatedly at room temperature. In addition, the self-healing polymer binder should have a modest conductivity (>about 0.1 S/cm). This example, therefore, implements the design of a conductive composite of a self-healing polymer (SHP) and conductive carbon black (CB) nanoparticles. The SHP is a randomly-branched hydrogen bonding polymer, synthesized and fabricated using an approach set forth further below. Its molecular structure is shown in FIG. 4b. The polymer is designed to have an amorphous structure with a low glass transition temperature (Tg). If there is a crack or mechanical damage, the amorphous structure and low Tg of the SHP will allow the polymer chains at the fractured interfaces to rearrange, approach, and intermix. This process is driven by the dynamic re-association of hydrogen bonds at room temperature and leads to spontaneous self-healing. Indeed, the amorphous nature of the polymer was confirmed by differential scanning calorimetry (DSC), as evidenced by the lack of a melting point peak over the whole temperature range (FIG. 5a). The DSC trace also confirms that Tg is about 0° C., much lower than room temperature. The SHP is made conductive (about 0.25 S/cm) by uniformly dispersing CB into the polymer. The composite undergoes simultaneous mechanical and electrical self-healing at room temperature (FIGS. 10-12). The self-healing capability is demonstrated in FIG. 5b, which shows that after two pieces of SHP acting as conductors in an electrical circuit were brought together for about 1 min, the circuit was completed, and a light emitting diode (LED) was illuminated again. At the same time, the composite can withstand mechanical bending at the healed location, indicating the quick electrical and mechanical healing at room temperature.

Figure 14:
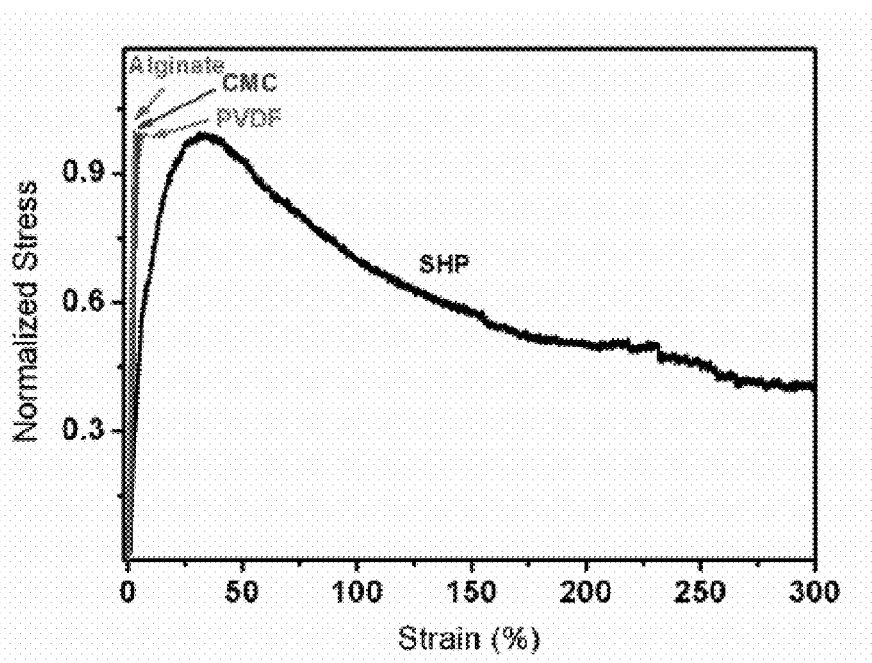
FIG. 14. Stretching of a SHP up to about 300% without breaking.
Figure 15:
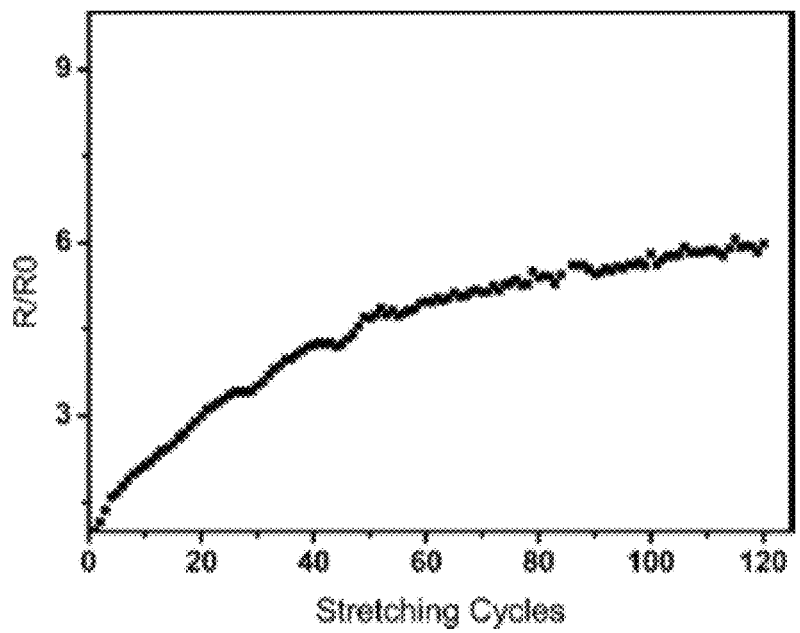
FIG. 15. The ratio of resistance (R) to original resistance (R0) over 120 cycles of stretching to 100%, showing that a composite can remain conductive even after >120 cycles of stretching.

The crosslinked network of the SHP provides good mechanical stretchability as well, allowing the polymer to accommodate potential expansion of silicon to avoid potential non-healable damage, such large cracks or delamination. As shown in FIG. 5c, the SHP can be stretched to about 300% of its initial length without breaking (FIG. 14). In comparison, traditional binders show much lower stretchability: polyvinylidene fluoride (PVDF), sodium carboxymethyl cellulose (CMC) and alginate samples with similar sizes can be stretched up to about 7%, about 4%, and about 2%, respectively. Moreover, the SHP/CB composite retains its electrical conductivity during stretching. As shown in FIG. 5d, the resistance of the composite coated on polydimethylsiloxane (PDMS) didn't change significantly as the composite is subjected to 100% strain. The resistance remained within the same order of magnitude when subjected to >120 stretching cycles (FIG. 15). This electromechanical durability also exists during expansion and shrinkage. An inflatable balloon coated with the SHP/CB composite (FIG. 5e) is used to mimic the volumetric changes of Si particles that take place during lithiation/delithiation process. The conductivity of the composite coating changed from about 0.25 S/cm to about 0.14 S/cm upon about 10× volume expansion, and the conductivity was observed to remain at about 0.05 S/cm even at the larger volume expansion of about 25×. Upon deflation, the conductivity was observed to revert close to the initial value.

Figure 6:
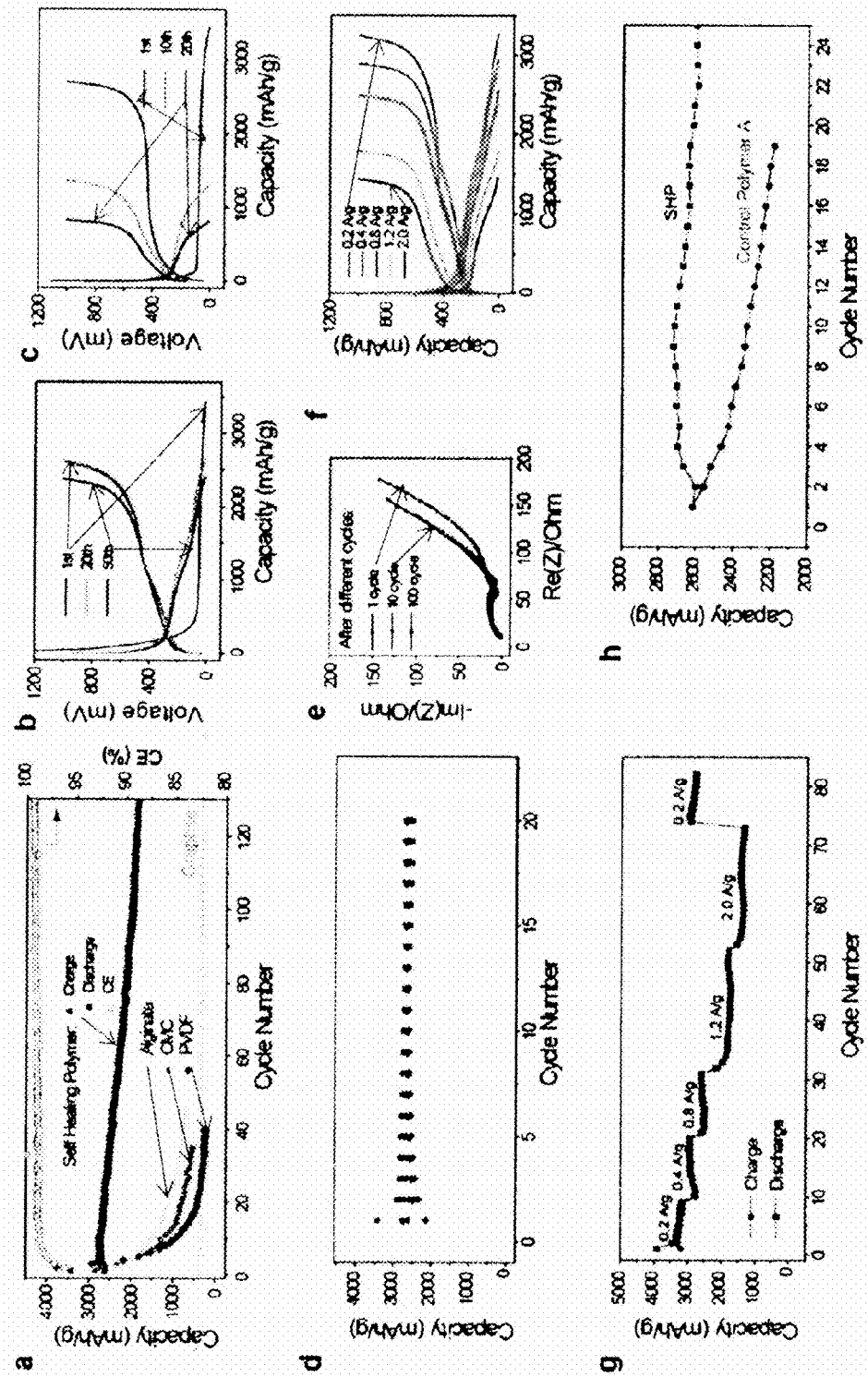
FIG. 6. Electrochemical properties of Si microparticle (SiMP) electrodes. a, Capacity retention of SiMP electrodes with different polymer binders, including the SHP/CB composite and conventional polymer binders (polyvinylidene fluoride (PVDF), sodium carboxymethyl cellulose (CMC), and alginate). All samples were cycled at the same charge/discharge rate of about C/10 with a potential window of about 0.01 to about 1 V versus Li/Li+. The dashed line indicates the theoretical capacity of a graphite electrode. The SiMP electrode with the SHP showed much longer cycling lifetime than conventional polymer binders. b, Voltage profiles of a SiMP/SHP/CB electrode at 1st, $20^{th}$, and 50th cycles, showing very little capacity decay during the cycling. c, Voltage profiles of a SiMP/CMC electrode at the 1st, $10^{th}$, and $20^{th}$ cycles, showing a much faster capacity decay than the self-healing electrode. d, Discharge capacity retention for six different SiMP/CMC electrode samples at a charging/discharging rate of about C/10. All six different batches showed similar cycling performance. e, Impedance spectroscopy measurements for a SiMP/SHP/CB electrode after different numbers of cycles, showing that no observable impedance increase even after 100 cycles. f and g, Galvanostatic charge/discharge profiles (f) and capacity retention (g) of a SiMP/SHP/CB electrode cycled at various current densities, showing the stable cycling stability at different charging/discharging rates. h, Discharge capacity retention of SiMP electrode with SHP and Control Polymer A. Control Polymer A showed much worse cycling stability than SHP. All samples were charged/discharged at a rate of about C/10. All electrochemical measurements (a-e) were carried out at room temperature in two-electrode 2032 coin-type half-cells. All the specific capacities are reported based on the weight of the SiMPs.

Next, fabrication of the self-healing Si electrodes proceeds by sealing SiMPs inside a SHP/CB composite coating (see Methods for detailed fabrication process). Coin cells with metallic Li counter electrodes were employed to evaluate the electrochemical performance of the electrodes. Upon deep galvanostatic cycling between about 0.01 and about 1 V, the discharge (delithiation) capacity reached about 2,617 mAh/g for the first cycle at a current density of about 0.4 A/g (FIGS. 6a and b), which is about 6 times higher than the theoretical capacity of graphite. The electrode shows good cycling stability: the discharge capacity retention is observed to be about 100%, about 95%, and about 80% after 20, 50, and 90 cycles, respectively. This is in drastic contrast to Si anodes with PVDF, CMC, and alginate, which demonstrated poor stability and retained about 14%, about 27%, and about 47% of their initial capacities after 20 cycles at the same current density (about 0.4 A/g). When defining the cycle life as the number of cycles to reach 80% of the initial capacity, the cycling life of the self-healing SiMP electrode (90 cycles) is more than 10 times longer than all the other SiMP electrodes (<9 cycles). The superior cycling stability and the high capacity of the SiMP/SHP/CB electrode are highly repeatable. The electrochemical cycling performance of six different batches of SiMP/SHP/CB electrodes are monitored, and all of them showed similar high capacity as well as negligible capacity loss after 20 cycles of deep charge/discharge cycling (FIG. 6d). Furthermore, a control sample with the same electrode structure but without SHP (FIG. 18) also showed poor cycling stability, confirming that the good cycling performance arises because of the SHP.

Figure 19:
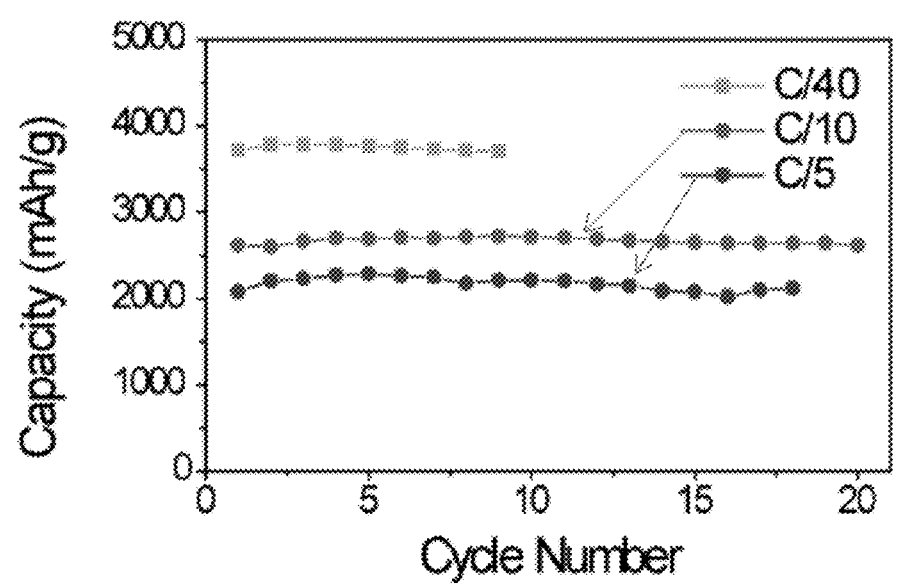
FIG. 19. Discharge capacity of a SiMP/SHP/CB electrode at different rates, where the capacity can reach up to about 3800 mAh/g at a rate of about C/40.
Figure 20:
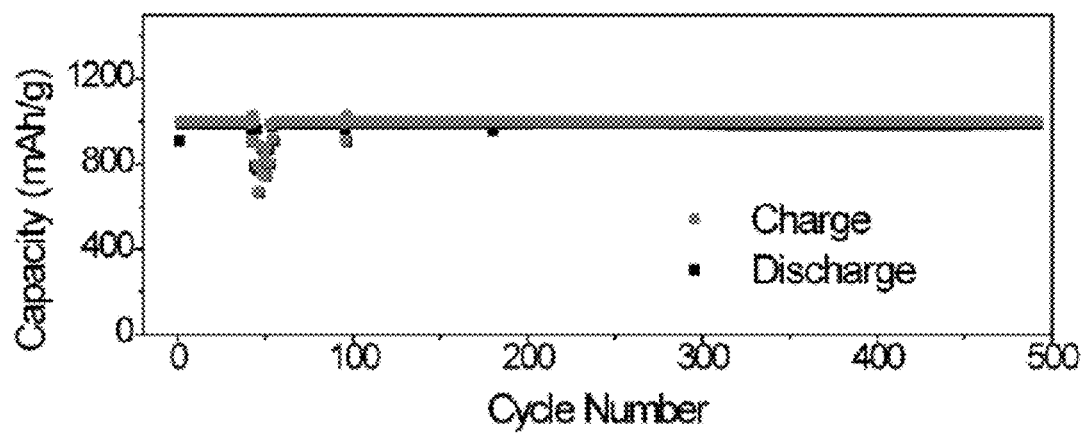
FIG. 20. Reversible Li-extraction capacity of a SiMP/SHP/CB electrode versus cycle number for the Li insertion level fixed to about 1000 mAh/g.

Rate capability tests showed that the SiMP/SHP/CB electrodes retain their stable cycling stability at various rates, as shown in FIG. 6f-g and FIG. 19. In addition, a high capacity of about 3,200 mAh/g was achieved at the charge/discharge current density of about 0.2 A/g (corresponding to a cycling rate of about C/20, where the rate was based on the theoretical capacity of Si). Even at a higher current density of about 2.0 A/g (or about C/2 rate), the electrode is able to maintain a capacity of about 1,400 mAh/g (FIGS. 6f and g). Finally, the superior cycling stability of the SiMP/SHP/CB electrode was also observed in constant-capacity cycling experiments where the Li insertion capacity was set to about 1,000 mAh/g, with >500 electrode cycles (FIG. 20).

High Coulombic efficiency (CE) is also desired for practical Si-based electrodes. For the SiMP/SHP/CB electrodes, the CE of the first cycle is more than about 80%. In later cycles, the CE of the SiMP/SHP/CB electrode is about 98.5% at a cycling rate of about C/10, and it reaches about 99.2% at about C/2 cycling rate. The CE of the SiMP electrode is at least comparable to electrodes based on silicon nanoparticles and nanowires. The high CE indicates stable SEI formation and reduced side reactions from the SHP in the electrode. In addition, no observable impedance increase occurs even after 100 cycles, indicating limited growth of the SEI during the cycling processes.

Figure 7:
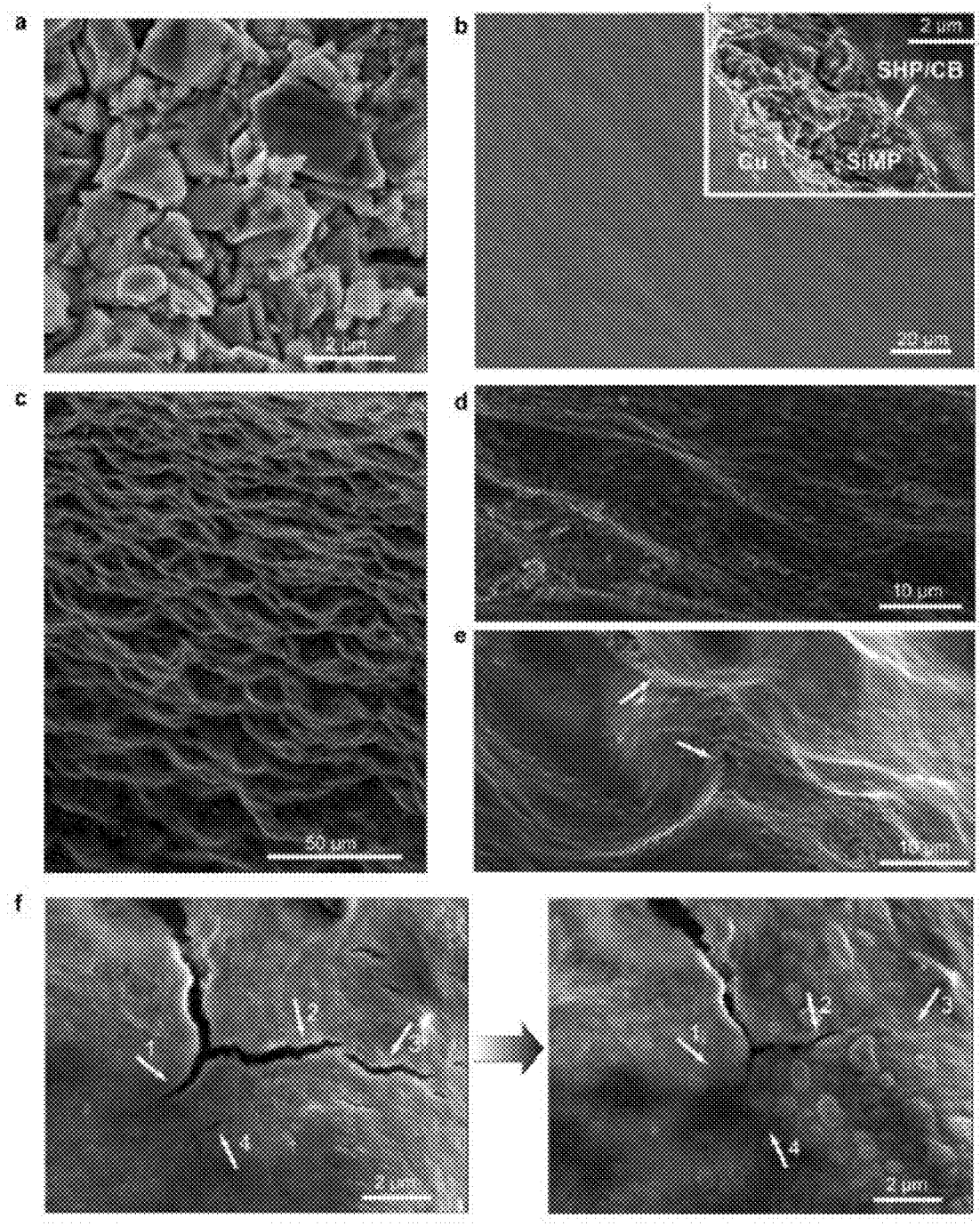
FIG. 7. Structure of a self-healing SiMP electrode during electrochemical cycling. a, Bare SiMPs have a large size distribution. The initial SiMPs have an average diameter of about 4.2 µm, with a size distribution range from about 2 to about 7 µm. b, Surface morphology of the electrode before cycling. Inset: Cross-sectional Scanning Electron Microscopy (SEM) image of the electrode showing the layered structure. From left to right the layers are 1) a copper (Cu) layer as a current collector, 2) the SiMP layer as an active material, and 3) the self-healing conductive composite (SHP/CB) coating. c, A continuous wave-like morphology of the surface of the electrode is evident after 20 cycles at a rate of about C/10. d, Magnified image of the wave-like structure. e, Some scar-like structures (as pointed out by the arrows) can be found on the electrode after the cycling process, which appeared to be cracks that were subsequently healed. f, Left: cracks in the polymer layer in the lithiated state; right: after about 5 hours, the smaller cracks were healed, indicated by the arrows on the images.
Figure 21:
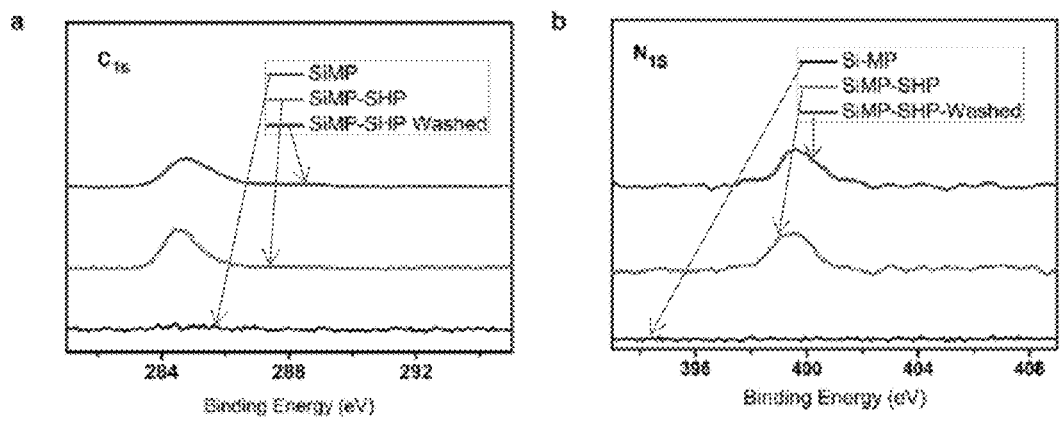
FIG. 21. X-Ray Photoelectron Spectroscopy (XPS) characterization: a, C1s and b, N1s spectra of pristine SiMPs, SiMP-SHP electrode, and SiMP extracted from the electrode after extensive purification.
Figure 23:
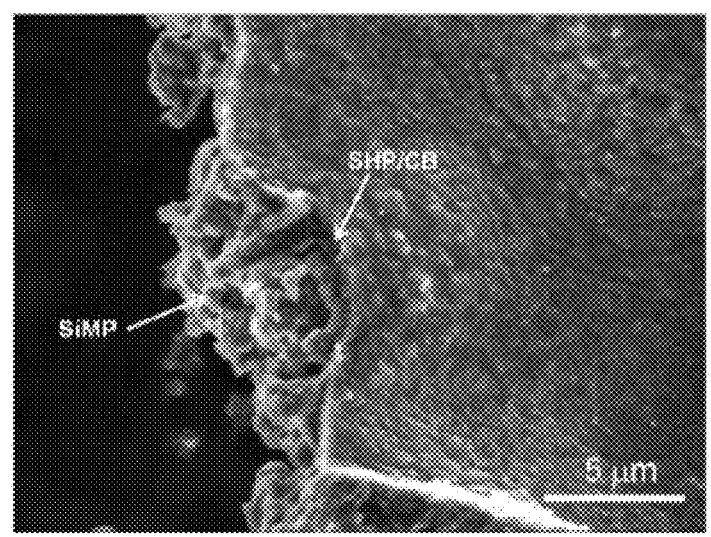
FIG. 23. Cross-sectional SEM image of an electrode after 20 cycles at a rate of about C/10.

The improved cycling stability of the electrode can be attributed to at least two major features associated with the SHP/CB composite coating: (i) stretchability and (ii) spontaneous self-healing capabilities. Owing to its superior mechanical stretchability as well as its strong interactions with the Si surface (FIG. 21), the SHP/CB coating can better withstand the large volumetric changes of SiMPs during lithiation/delithiation to bring the Si particles into contact with the polymer binder and at the same time avoids large non-healable cracks in the polymer binder. When the SHP/CB composite coating does undergo fracture, it can proceed to self-heal. These two features of the SHP allow the electrode structure to be maintained over repeatable cycling processes. To provide further evidence, the morphology of the electrode with cycling was monitored using Scanning Electron Microscopy (SEM). Before cycling, the SiMP layer (about 3 μm) was covered with a thin layer (about 200 nm) of the conductive SHP/CB composite, which displayed a flat and smooth morphology (FIG. 7a-b). After electrochemical cycling (20 cycles at a rate of about C/10), the SHP/CB layer became rough and has a continuous wave-like morphology (FIGS. 7c and d). This is due to the underlying SiMPs being deformed when subjected to repeated volume expansion and contraction processes. No significant cracks or delamination was observed. Cross-sectional SEM imaging of the electrode after cycling showed that a clear boundary still exists between the SHP/CB and SiMP layers, indicating that the electrode structure is highly stable over the repeated cycling processes (FIG. 23).

The self-healing capability of the electrode was also captured by SEM (FIG. 7f). Small cracks were observed in the polymer coating on the lithiated and expanded Si immediately after charging. However, when the sample was subsequently left for about 5 hours, it was observed that the initial smaller cracks were completely healed (indicated by the arrows). In addition, the larger cracks also showed partial healing, and they were able to heal more completely during the delithiation process since the shrinking process brought the fractured surfaces into closer contact.

Figure 9:
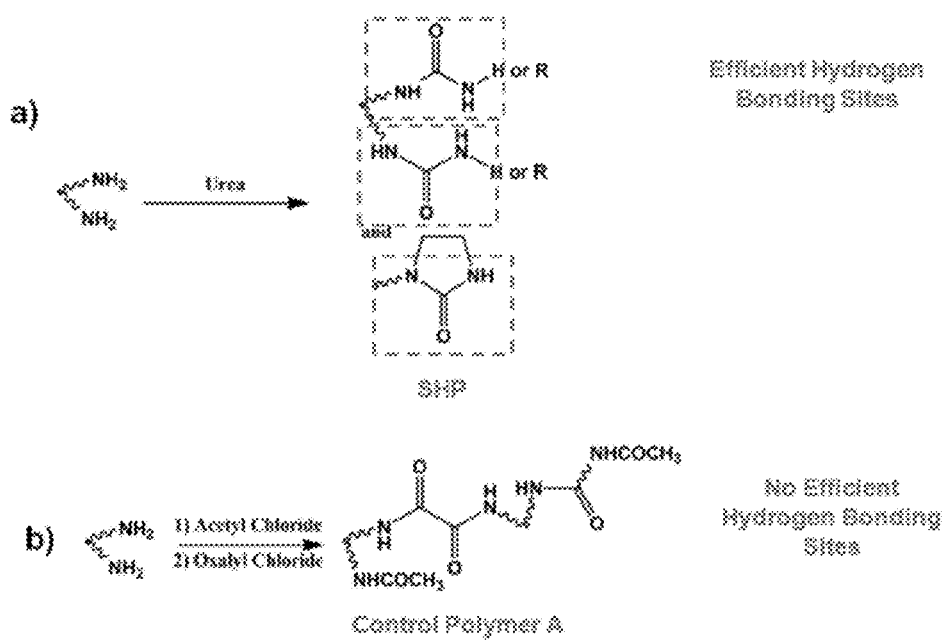
FIG. 9. Scheme S1: Design of a self-healing polymer and a control polymer A.
Figure 24:
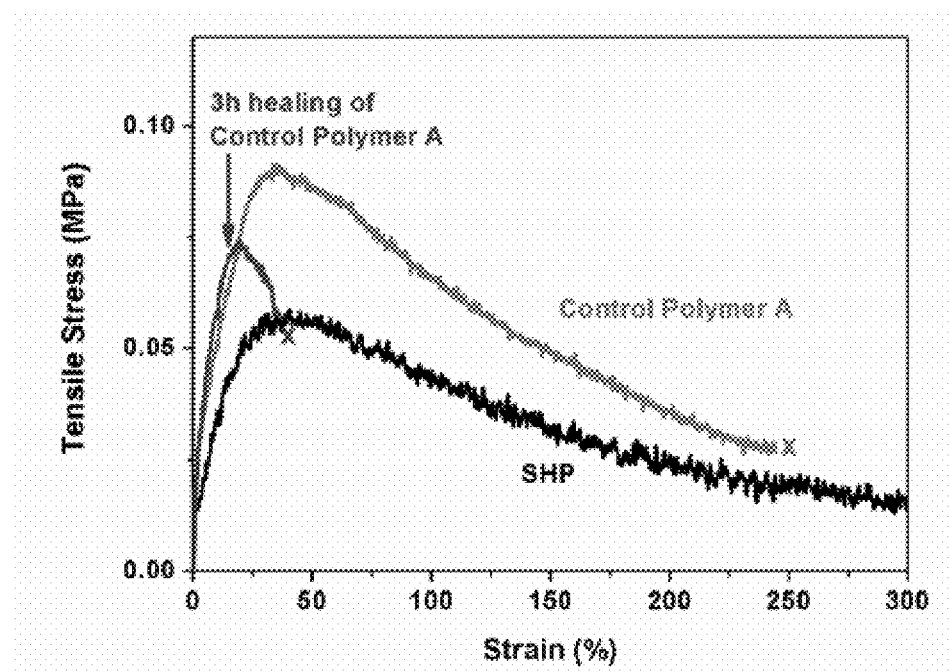
FIG. 24. Tensile tests of a pristine control polymer A and a self-healing sample.

The contribution of the self-healing effect to battery performance was further confirmed by replacing the SHP with a control polymer A, which is also highly stretchable, but has significantly less self-healing capability than the SHP (FIGS. 9 and 24). Batteries made with the control polymer A showed much lower cycling stability compared to those with the SHP (FIG. 6H).

By way of summary, this example demonstrates the use of self-healing chemistry in battery application. Other alloy-type anode materials with large-volume changes during cycling, such as tin (Sn) and germanium (Ge), can also benefit from this approach, and it can be advantageous for certain cathode materials, such as sulfur. This concept of a self-healing electrode can also be useful for other materials suffering from mechanical issues during electrochemical reactions, including electrode materials for fuel cells, water-splitting, and catalysis.

Summary of Methods:

The SHP is synthesized through a condensation reaction. About 100 mg of the SHP was dissolved in about 1 mL of chloroform and then mixed with carbon black nanoparticles (CB, about 15 mg, from TIMCAL) using a Dual Asymmetric Centrifugal Mixer (Flacktek) (about 3500 rpm, about 135 seconds) to obtain a homogeneous suspension. The suspension was then drop-cast onto a glass slide and dried overnight to form the self-healing conductive composite. About 0.1 g SiMP (Sigma-Aldrich) was dispersed in about 10 ml ethanol by sonication. Working electrodes were prepared by drop-casting the silicon suspension onto Cu foil (Fukuda). After drying at room temperature followed by calendaring, uniform electrodes with a SiMP loading of about 1 mg/cm² were prepared. The Si electrode was heated to about 100° C. on a hot plate. The self-healing conductive composite was then melted at about 100° C. and coated on the silicon electrode with a sharp blade. The electrodes were degassed in vacuum at room temperature overnight and were transferred to an argon (Ar) glove box for battery assembly. The electrochemical properties were examined by galvanostatic cycling of 2016 stainless-steel coin cells with the SiMP/SHP/CB electrode as the working electrode. Li metal foil (about 1 mm thick) was used as a counter electrode. The electrolyte for all tests was about 1 M LiPF$_6$ in ethylene carbonate/diethylcarbonate/fluoroethylenecarbonate (about 1:1:0.04 v/v/v, Ferro Corporation), and separators (about 25 μm) from Asahi Kasei Co. were used. The charge and discharge rates were calculated assuming theoretical capacities for Si. The CE was calculated as $(C_{dealloy}/C_{alloy}) \times 100\%$, where $C_{alloy}$ and $C_{dealloy}$ were the capacity of the anodes for Li insertion and extraction.

Figure 8:
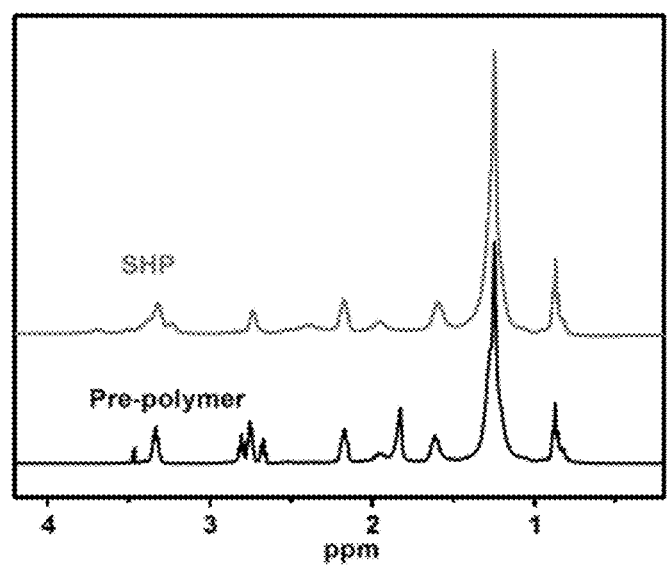
FIG. 8. NMR of a self-healing polymer.

Design and Synthesis of the Self-Healing Polymer:

The design and synthesis of the self-healing polymer is a modified approach from other reports. Here, CB nanoparticles are further incorporated to impart conductivity and tune the mechanical properties of the self-healing polymer to be suitable for lithium-ion batteries. The amount of urea and reaction time are controlled so that a fraction of the amine groups were converted into urea, yielding a polymer that is able to self-heal at room temperature without addition of any plasticizer. First, a mixture of diacid and triacid (Empol 1016, about 41.5 g, donated by Congnis) was reacted with diethylenetriamine (about 17 g) at about 160° C. for about 24 h with Ar protection into a randomly branched oligomer terminated with amine groups (M-NH$_2$). About 1.5 g of M-NH$_2$ was reacted with about 200 mg of urea for about 4 h (about 130° C. for about 2 h, about 135° C. for about 1 h, and about 140° C. for about 1 h) to obtain the self-healing polymer (SHP). As shown by NMR in FIG. 8, the peaks at about 2.6 and about 2.8 of the pre-polymer (M-NH$_2$) correspond to the protons on CH$_2$ connected to primary amines. The peaks at about 2.75 correspond to the protons on CH$_2$ groups connected to secondary amines. Upon reaction, substantially all of the primary amine groups and about half of the secondary amine groups were converted into urea.

Synthesis of Control Polymer A:

The randomly branched oligomer (M-NH$_2$, about 1.5 g), prepared according to the same procedure described as the first operation of the SHP synthesis, was dissolved in about 5 ml of anhydrous dichloromethane, and about 0.4 ml of acetyl chloride was added dropwise under vigorous stirring. After about 5 min, oxalyl chloride (about 0.1 mmol) was further added to the mixture, dropwise, under vigorous stirring under Ar protection. After reaction for a further period of about 1 h, the dispersion was drop-casted on glass and heated to about 80° C. for about 10 min to substantially remove all solvents, followed by compression molding into samples for characterizations.

Characterization:

NMR ($^1$H) spectra were recorded on a Varian Mercury 400 NMR spectrometer at room temperature. X-Ray Photoelectron Spectroscopy (XPS) spectra were measured with a PH 5000VersaProbe system with an Al Kα radiation (about 1486 eV) source. Mechanical tensile-stress experiments were performed using an Instron 5848 Microtester according to ASTMD 638 normalized samples. Rheological experiments were carried out using a stress-controlled rheometer (TA Instruments Model AR-G2) with a parallel plate attachment. DSC experiments were performed using a DSC-Q100 from TA Instruments Waters (USA). The temperature range is about −50° C. to about 150° C. with a heating and cooling speed of about 20° C./min. For stretching tests on PDMS or balloon substrates, the substrates were first treated with oxygen plasma for about 1 min, then the chloroform dispersions of the conductive composites were drop-casted onto the substrates and left in air overnight to dry out the solvents. The conductivity of the composite was measured using the four-point probe technique with a Keithley 4200. The conductivity upon stretching was tested using a customized precision mechanical stretching system integrated with Keithley 4200. The stretching and releasing speed were about 5 mm/min.

Anode Fabrication and Electrochemical Tests:

A layer of pure SiMPs with a thickness of about 3 μm was coated on top of a Cu current collector via a drop casting approach. A thin layer of SHP/CB was then melt-coated on top of the SiMP layer.

Mechanical Healing of the Composites:

FIG. 10 shows tensile tests of the SHP/CB composites after different healing times. The samples were cut into two separate pieces. Then, the samples were gently brought together and allowed to heal for different lengths of time. As shown in FIG. 10, the composite can be stretched to more than 100% after being in contact for about 15 min. After about 3 h, the sample has already recovered about 90% of its pristine extensibility. This self-healing time is already enough for practical battery applications.

Self-Healing Capability of the SHP/CB Composite was Observed Directly by Optical Microscope:

As shown in FIG. 11, a crack on the SHP/CB sample can automatically be healed after about 20 h at room temperature, forming a scar-like structure.

Repeatable Electrical Healing of the SHP/CB Composite:

FIG. 12 demonstrates the repeatable self-healing capability of the composite. The samples were cut into two separate pieces and then brought together gently and allowed to heal for about 3 min. This process was repeated at the same damage location for multiple times, and the resistance of the sample was monitored. As shown in FIG. 12, the electrical conductivity can still be recovered even after ten cycles of cutting and healing at the same damage location, confirming the repeatable self-healing capability of the composite.

Figure 13:
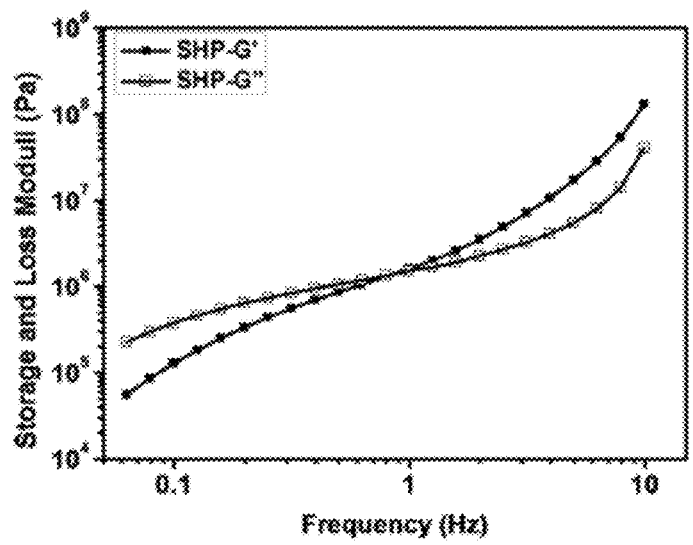
FIG. 13. Rheological results of a SHP.

Rheological Results:

FIG. 13 shows rheological results of the self-healing polymer. As shown in FIG. 13, the loss moduli (G") is higher than the storage moduli (G') at low frequencies, showing the viscoelasticity of the SHP.

Stretchability:

As shown in FIG. 14, the SHP can be stretched up to about 300% without breaking, showing excellent stretchability. FIG. 15 shows the ratio of resistance (R) to original resistance (R0) over 120 cycles of stretching to 100%, showing that the composite can remain conductive even after >120 cycles of stretching.

Figure 16:
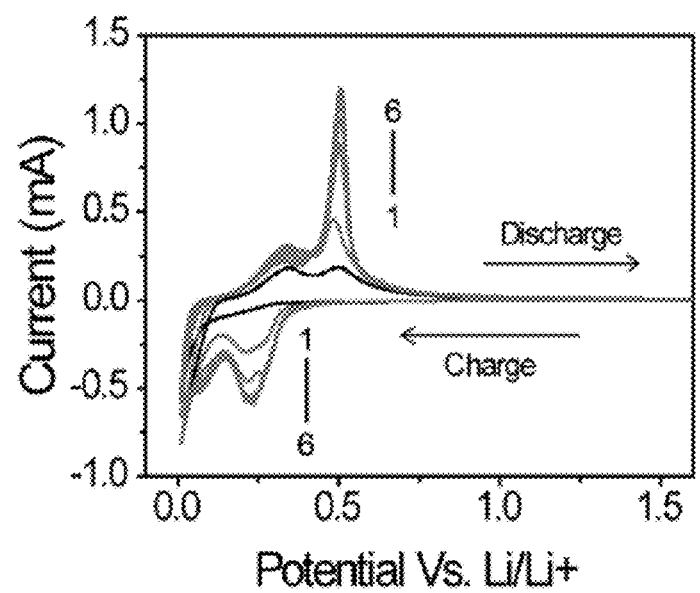
FIG. 16. Cyclic voltammogram (CV) for Si electrodes from about 2.0 V to about 0.01 V versus Li/Li+ at about 0.2 mV/s scan rate.
Figure 17:
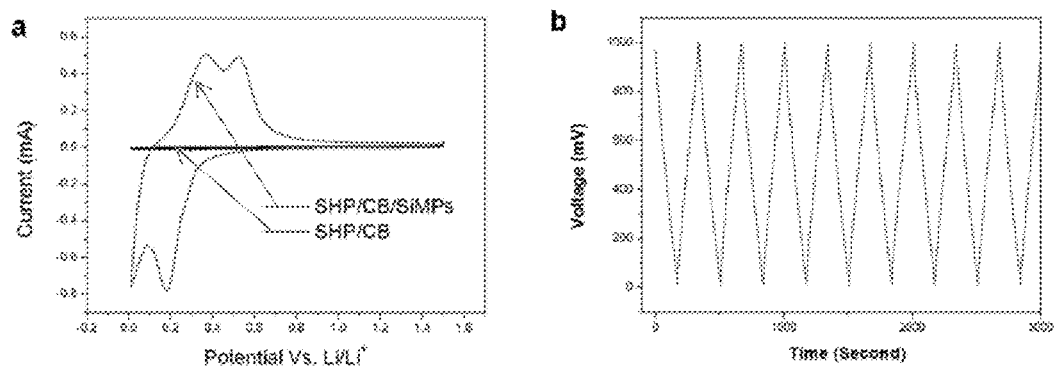
FIG. 17. a, CV measurement of a SHP/CB composite without SiMPs and a SHP/CB/SiMP electrode at a scan rate of about 0.1 mV/s over the potential range of about 0.01-1.5 V vs. Li/Li+. b, Charge/discharge cycle of a SHP/CB composite without SiMPs. The discharge capacity is calculated to be about 10 mAh/g.

Cyclic Voltammogram (CV) Measurements:

FIG. 16 shows a CV for Si electrodes from about 2.0 V to about 0.01 V versus Li/Li+ at about 0.2 mV/s scan rate. The first six cycles are shown. It shows that the SiMP/SHP/CB electrode exhibited similar electrochemical CV profiles as other Si powder electrodes. FIG. 17a shows CV measurement of a SHP/CB composite without SiMPs and a SHP/CB/SiMP electrode at a scan rate of about 0.1 mV/s over the potential range of about 0.01-1.5 V vs. Li/Li+. The CV profiles of dried SHP/CB films alone showed that the current density is more than two orders of magnitude lower than that of the silicon electrode, indicating that the SHP does not significantly contribute to the electrode's capacity.

FIG. 17b shows charge/discharge cycle of a SHP/CB composite without SiMPs. The discharge capacity is calculated to be about 10 mAh/g.

Figure 18:
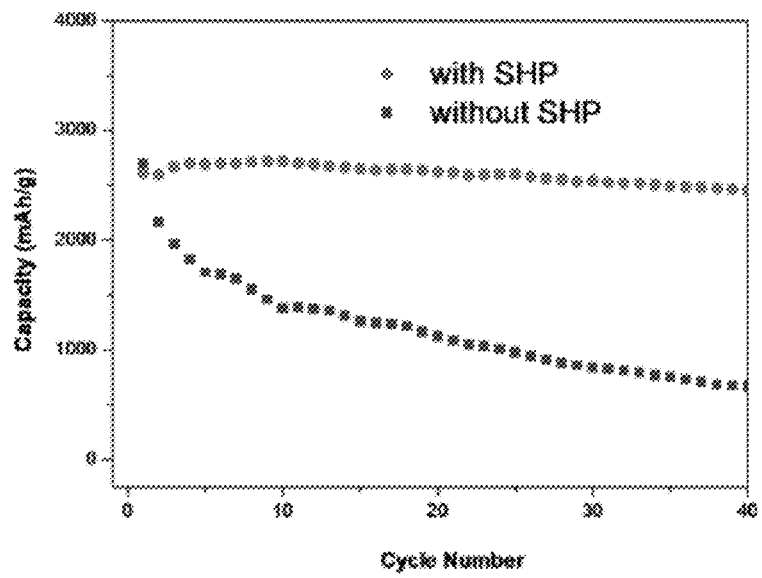
FIG. 18. Cycling performance of a SiMP electrode with the same structure but without a SHP, showing that the superior cycling performance of the electrode is due to the SHP.

Cycling and Rate Performance:

FIG. 18 shows cycling performance of a SiMP electrode with the same structure but without a SHP, showing that the superior cycling performance of the electrode is due to the SHP. FIG. 19 shows discharge capacity of a SiMP/SHP/CB electrode at different rates, where the capacity can reach up to about 3800 mAh/g at a rate of about C/40. FIG. 20 shows reversible Li-extraction capacity of a SiMP/SHP/CB electrode versus cycle number for the Li insertion level fixed to about 1000 mAh/g.

XPS Characterization:

To evaluate the interactions between the polymer and Si particles, a composite of the self-healing polymer and Si microparticles was prepared. The as-prepared composite was washed thoroughly with large quantities of chloroform (a solvent for the SHP) for about 12 h, and the particles were filtered. This washing and filtering procedure was repeated three times. Even after this extensive purification, the SHP remained on the surfaces of the particles, as shown by the XPS results in FIG. 21. Both the SHP and Si-SHP showed characteristic carbon C1s peaks, while the pristine Si microparticles alone did not show any detectable C1s signals on the surface, as expected. After the above washing procedures were carried out, a strong C1s peak remained in the XPS scan, indicating a substantial amount of the SHP was still retained on the surface of the washed Si microparticles from the composite. The N1s peak further confirmed the existence of the SHP on the washed Si microparticles. This evidence indicates that the SHP has strong interactions with the surface oxide layer on the SiMPs, most likely through hydrogen bonding.

Figure 22:
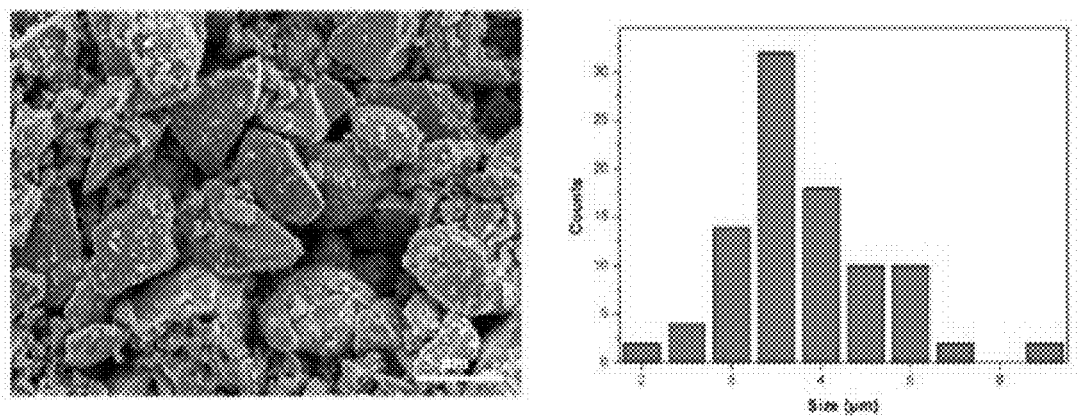
FIG. 22. SEM image (left) and size distribution (right) of SiMPs. The average diameter of the particles is about 4.2 µm.

SEM Characterization:

FIG. 22 shows a SEM image (left) and a size distribution (right) of SiMPs. The average diameter of the particles is about 4.2 μm. FIG. 23 shows a cross-sectional SEM image of an electrode after 20 cycles at a rate of about C/10. As shown in FIG. 23, the SiMPs become smaller particles after cycling for 20 times at a rate of about C/10. The cracked particles are still tightly held by the self-healing coating. There is still a clear boundary between the polymer layer and the particle layer, indicating that the SHP/CB layer remains stable during cycling.

Mechanical Performance and Self-Healing Capability of Control Polymer A:

FIG. 24 shows tensile tests of the pristine control polymer A and the self-healing sample. As shown in FIG. 24, the control polymer A has a good stretchability similar with the SHP, but significantly lower self-healing capability. After the control polymer A was cut and brought together, its extensibility healed less than about 20% even after about 3 h. In contrast, the SHP can heal more than about 50% of its extensibility in about 15 min.

Example 2

Electrically and Mechanically Self-Healing Composite with Pressure- and Flexion-Sensitive Properties for Electronic Skin Applications Pressure sensitivity and mechanical self-healing are two vital functions of the human skin. A flexible and electrically conducting material that can sense mechanical forces and yet be able to self-heal repeatably can be of use in emerging fields such as soft robotics and biomimetic prostheses, but combining all these properties together is a challenging task. This example describes a composite material composed of a supramolecular organic polymer with embedded nickel nanostructured microparticles, which shows mechanical and electrical self-healing properties at ambient conditions. This example also shows that the material is pressure- and flexion-sensitive, and therefore suitable for electronic skin applications. The electrical conductivity can be tuned by varying the amount of nickel particles and can reach values as high as about 40 S cm$^{-1}$. Upon rupture, the initial conductivity is repeatably restored with about 90% efficiency after about 15 s healing time, and the mechanical properties are substantially completely restored after about 10 min. The composite resistance varies inversely with applied flexion and tactile forces. These results demonstrate that natural skin's repeatable self-healing capability can be mimicked in conductive and piezoresistive materials, thus potentially expanding the scope of applications of current electronic skin systems.

The remarkable ability of human skin to self-repair allows it to function as a protective barrier, despite being subjected to constant damage, while continuously sensing the external environment. An ideal biomimetic electronic sensor skin should demonstrate similar mechanical sensing and repeatable self-healing capabilities, the fulfillment of which will involve self-healing electrodes (e.g., conductivity>1 S cm$^{-1}$) and tactile sensors. For practical use, both electrodes and sensors should further demonstrate repeatable electrical and mechanical healing at room temperature, even at the same damage location, much like human skin. Electronic skins are approaching human skin like properties and performance in terms of mechanical sensing and form factor, but the ability to repeatably self-heal has not been demonstrated in electronic skins to date. Such ambient repeatable self-healing and mechanical-sensing capability will be useful in bioprosthetics and the emerging field of soft robotics, where robots are made of soft, flexible, and conformable materials.

This example demonstrates a repeatable, room-temperature self-healing electronic sensor skin, using a supramolecular organic-inorganic composite. A conductivity as high as about 40 S cm$^{-1}$ was measured for the composite, which is four orders of magnitude higher than previously reported self-healing conductive organometallic polymer films. The composite material is mechanically flexible, and is capable of sensing tactile and flexion forces. This example demonstrates a self-healing conductive composite made using a supramolecular polymer host.

Materials Fabrication

Figure 25:
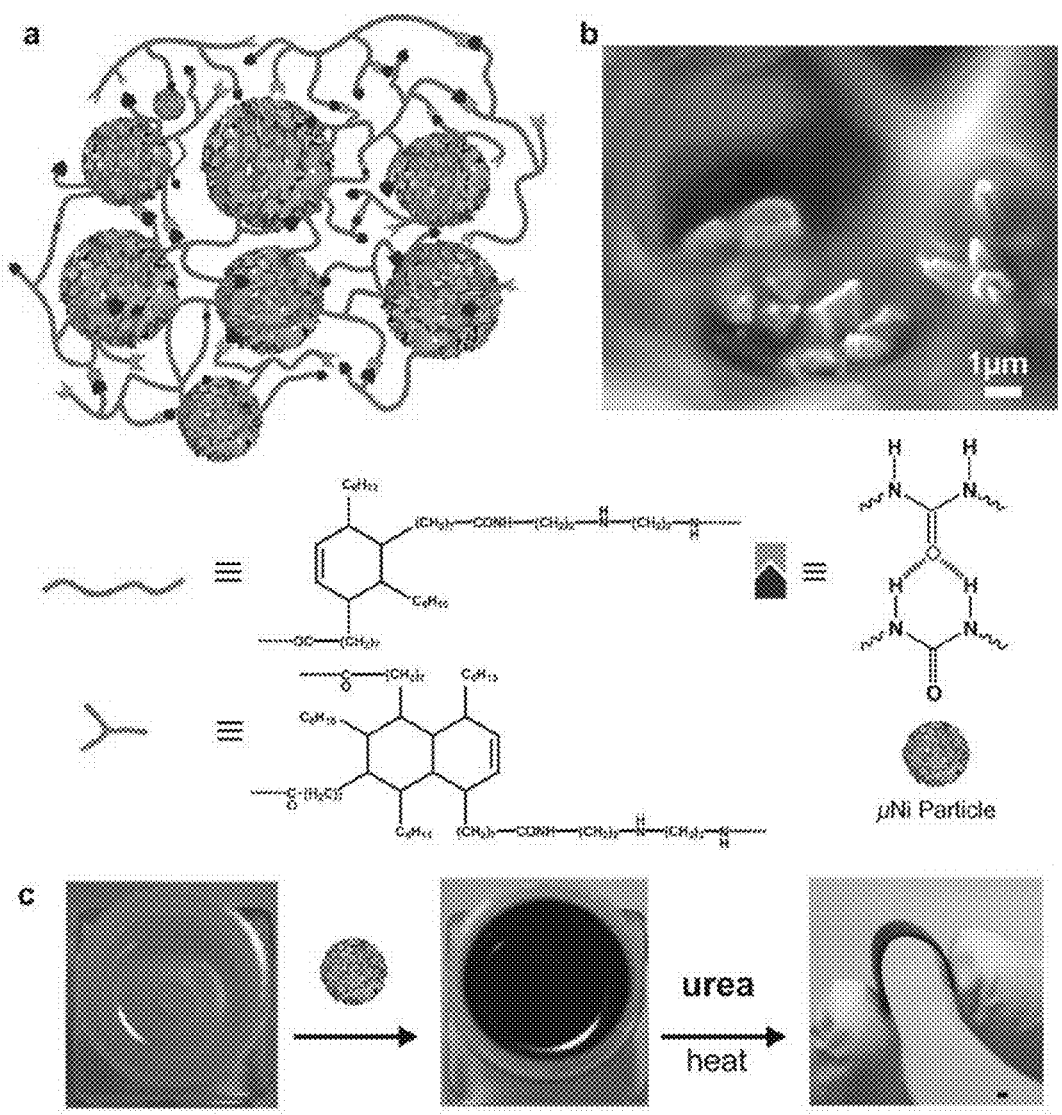
FIG. 25. Preparation of a self-healing composite. a, Proposed interaction of oligomer chains with micro-nickel (mNi) particles. b, SEM of the wetting of the oligomer on the preserved nano-corrugated surface of the mNi particles. Scale bar, 1 µm. c, Manufacturing process flow. Left: an initial randomly branched oligomer network in chloroform is synthesized from Empol 1016 and diethylenetriamine (DETA). Middle: mNi particles are mixed in to form a homogeneous suspension of the oligomer network. Right: optical image of the compression-molded self-healing electronic composite material, demonstrating the flexibility of the material. Scale bar, 1 mm.

FIG. 25 presents a schematic of material preparation. The material includes two components: (i) a supramolecular polymeric hydrogen-bonding network with a glass transition temperature Tg below room temperature and (ii) chemically compatible micro-nickel (mNi) particles with nanoscale surface features (FIG. 25a). The supramolecular polymeric hydrogen-bonding network provides a self-healing function via the large number of weak hydrogen bonds, which break preferentially (instead of the stronger covalent bonds) during a mechanical damage event. These 'broken' hydrogen bonds have been shown to dynamically associate and dissociate at room temperature to provide a passive healing mechanism at a fracture surface. Additionally, a low Tg allows the polymer chains on fractured interfaces to rearrange, approach, wet, and diffuse, thereby allowing healing under ambient temperatures. A low Tg alone, without hydrogen-bonding sites (or other reversible bonding sites), does not allow self-healing. For example, polydimethoxysilane (PDMS) has a Tg of less than −100° C., but due to the lack of reversible polymer bonding, PDMS composite systems cannot self-heal.

Figure 29:
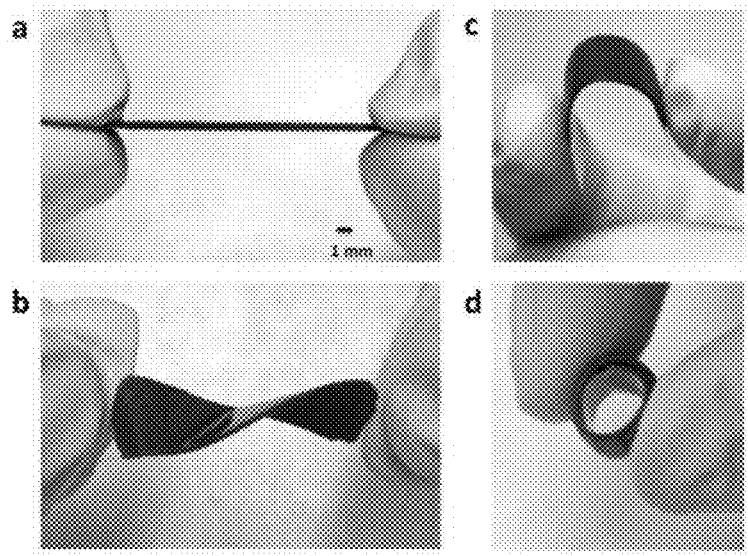
FIG. 29. a, about 600 micrometer thick self-healing composite on about 50 micrometer thick PET sheet. b, self-healing composite film twisted on both ends without delamination. c, flexed to about 5 mm radius of curvature. d, rolled into about 4 mm diameter.

A mixing process that preserves the nanofeatures of the mNi particles (FIG. 25b) was used (see Methods) to disperse the mNi particles into the polymer network, followed by thermal crosslinking with urea (FIG. 25c). mNi particles disperse well in the supramolecular hydrogen-bonding network for two reasons. First, the relatively large size of the spherical particles leads to a reduction in phase aggregation, while the nanometer-scale corrugated surface provides an adequate surface area for wetting. Second, the presence of a thin native oxide layer on the particles provides an affinity for hydrogen bonds in the synthesized supramolecular oligomers. The presence of reversible hydrogen bonding allows the composite material to self-adhere (without the use of adhesives) to flexible substrates such as oxygen plasma-activated polyethylene terephthalate (PET) sheets. The laminated composite can withstand flexing into various conformations (FIG. 29). The composite material can be as thin as about 600 μm, based on specifications of a compression molding setup.

Electrical Characterization of Self-Healing Composite

Figure 26:
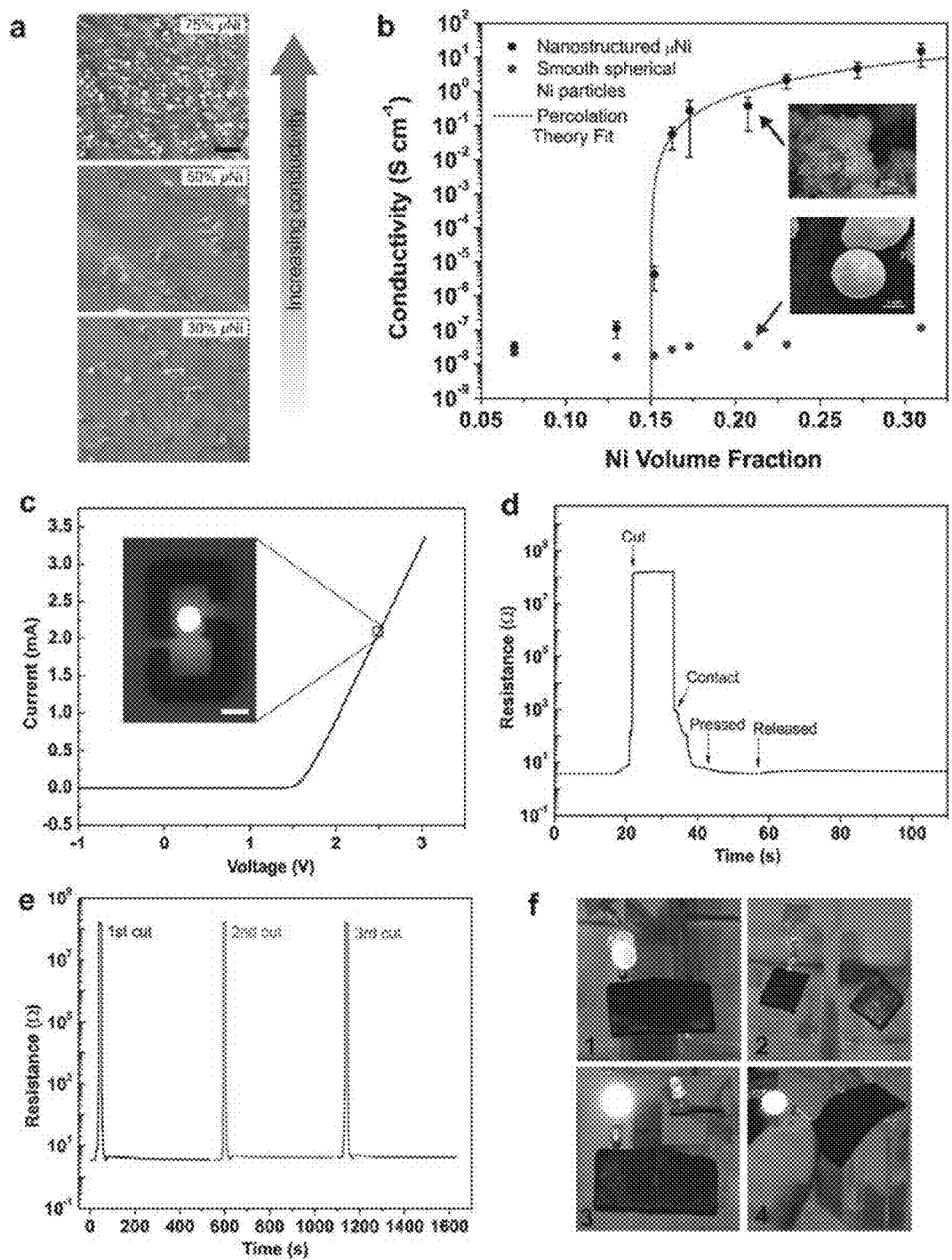
FIG. 26. Electrical and conductive healing efficiency characterization of a self-healing composite. a, Cross-sectional SEM images of composite materials showing decreasing particle separation distance as mNi concentration increases. No aggregation was observed even at a high mNi loading of about 31 vol %. Scale bar, 20 µm. b, Volume electrical conductivity as a function of mNi particle concentration from four-point probe measurements. Error bars represent s.d. from six samples per volume fraction (Table 2). Inset: SEM images of the nanoflower-like surface of the mNi (top) and the comparatively smooth surface of comparison spherical nickel particles (bottom). The microparticles have a small size distribution around a diameter of about 2-5 µm. Line represents the best-fit line for conductivity above percolation threshold using percolation theory (FIG. 29). c, I-V curve of a commercial LED using self-healing electrically conductive composite wire molded into an 'S' shape. Inset: image of circuit taken at about 2.5 V (scale bar, 10 mm). d, Time evolution of the electrical healing process using resistance measurements for about 15 s healing time at room temperature. e, Repeated electrical healing for three cuts at the same severed location. f, Demonstration of the healing process for a conductive composite with a LED in series with a self-healing electrical conductor. 1, undamaged conductor; 2, completely severed conductor (open circuit); 3, electrical healing (inset shows conductor being self-supporting); 4, healed film being flexed to show its mechanical strength and flexibility after about 5 min at room temperature.
Figure 30:
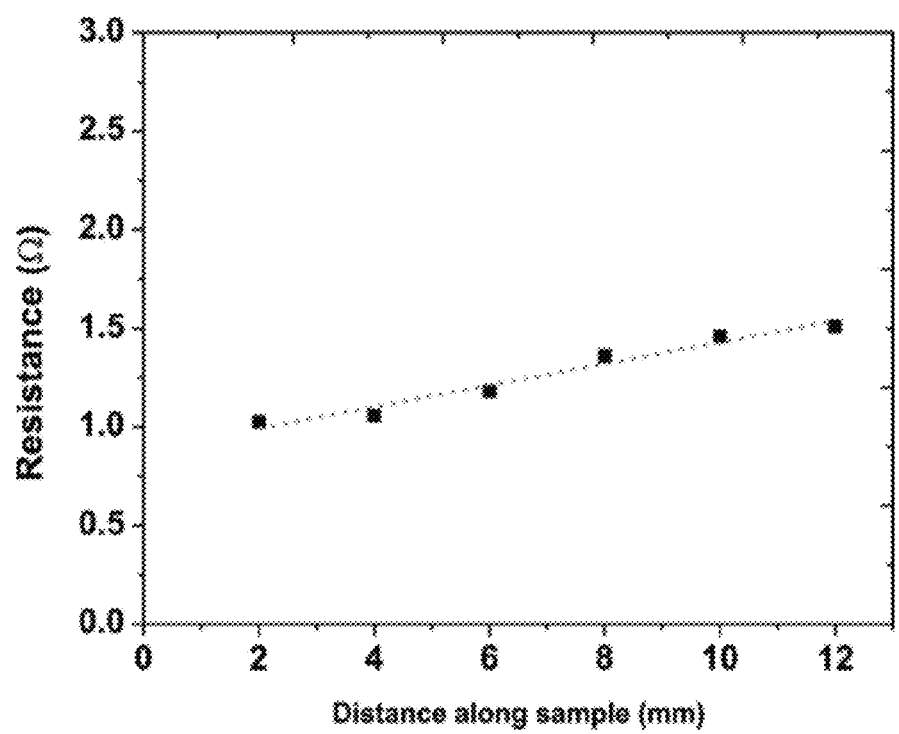
FIG. 30. Linear resistance variation across an about 31% Ni volume fraction sample measured using 2-point probe measurement.
Figure 31:
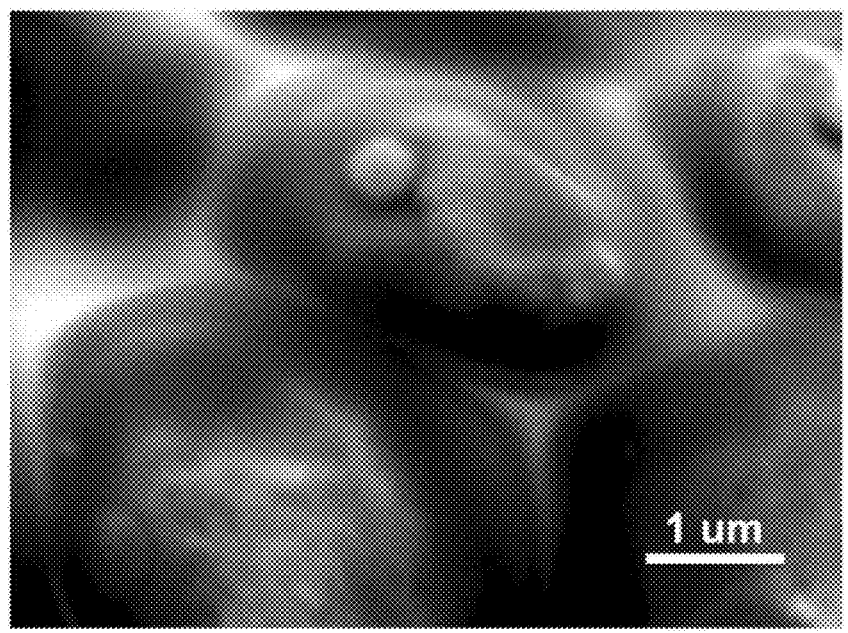
FIG. 31. SEM image of smooth spherical particles devoid of surface nano-structures similarly dispersed a polymer matrix.

FIG. 26a shows the composite cross-section morphology with increasing nickel volume fraction, obtained using SEM analysis. No phase aggregation of nickel particles was observed up to about 31% volume fraction (about 75 wt %) of mNi particles. To further assess the dispersion of the nickel particles, the variation of resistance within each sample was measured. The resistance was found to be linearly proportional to the distance between the probes (FIG. 30), indicating good dispersion and a lack of phase aggregation of nickel particles in the supramolecular host. The conductivities of each composite were measured using a four point probe technique. Six samples for each volume fraction (total 54 samples) were measured, and the average volume conductivities are plotted with error bars (standard deviation, s.d.) in FIG. 26b. At about 31% volume fraction, the conductivity reached about 40 S cm$^{-1}$ (average of about 18 S cm$^{-1}$), making this composite suitable for use in electrodes in electronic devices. The nanostructures on the surface of the nickel microparticles contribute towards imparting high conductivity, because they facilitate interparticle quantum tunneling by enhancing the local electric field at the asperities of the surface. As shown in FIG. 26b, the conductivity of the composite with smooth nickel microparticles remained below about 1×10$^{-6}$ S cm$^{-1}$, even at high loading (FIG. 31).

Figure 32:
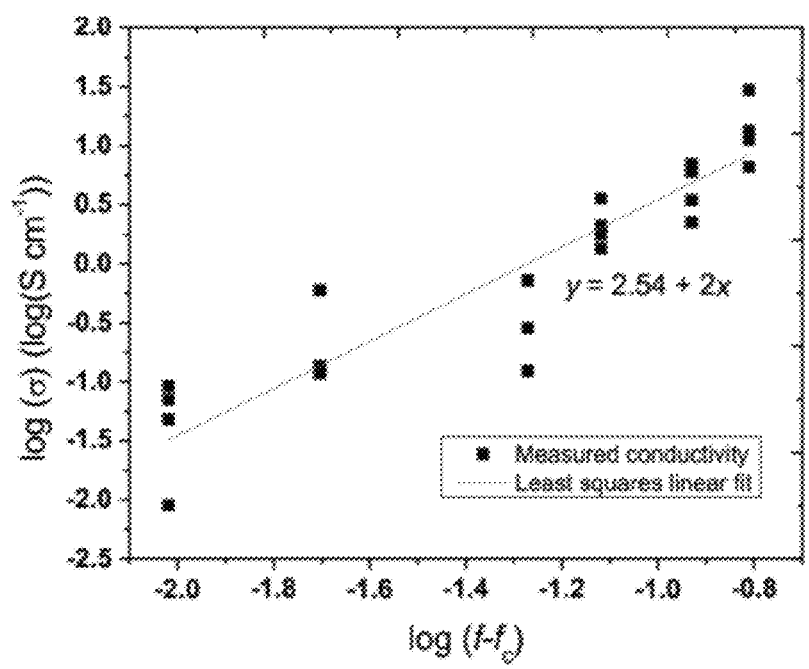
FIG. 32. Linear least squares regression fit of measured conductivity versus volume ratio of Ni.

The trend of an increase in volume conductivity as a function of nickel volume ratio agrees well with percolation theory, which describes an exponential increase above the percolation threshold (solid line in FIG. 26b; see also FIG. 32). The percolation threshold was found to be about 0.15 volume fraction of the mNi particles, which is close to the ideal percolation threshold value of about 0.16 for spherical particles. Below the percolation threshold, the conductivities were considerably lower and relatively constant, which also agrees with percolation theory.

Figure 33:
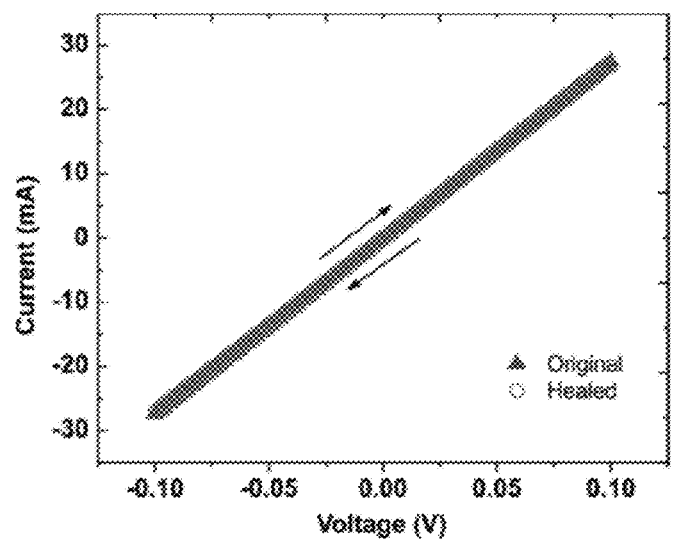
FIG. 33. I-V curve showing lack of hysteresis in both original and healed samples of about 31 vol % Ni.

The composite material displayed the linear, non-hysteretic current-voltage characteristics expected of a good electrical conductor (FIG. 33). FIG. 26c shows that the conductive composite can be used in conducting wires in an electronic circuit for devices such as LEDs. A turn-on resistance of about 200Ω was observed, as indicated by the linear region of the I-V curve (due to parasitic resistance from two thin 50-μm-diameter stainless steel wires used as the flexible leads to the voltage source meter).

Figure 34:
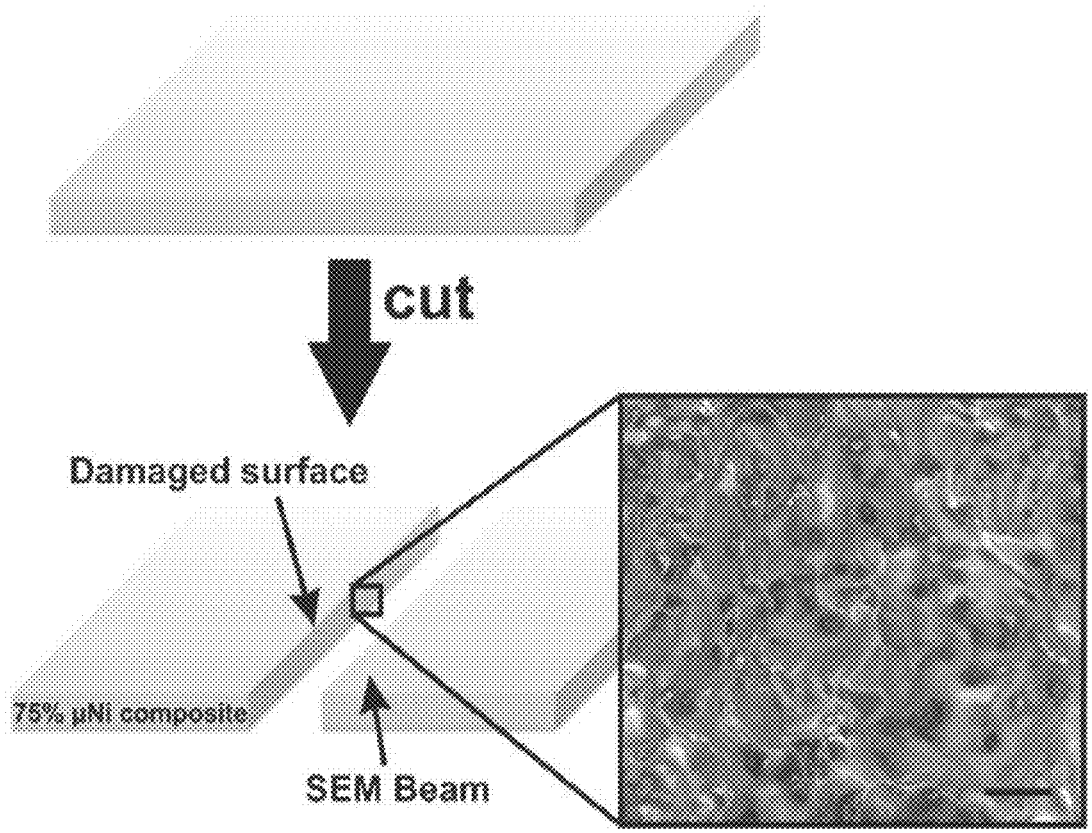
FIG. 34. Cross-section SEM image of composite showing healing interface with well-dispersed Ni particles. Scale bar: 10 μm.
Figure 46:
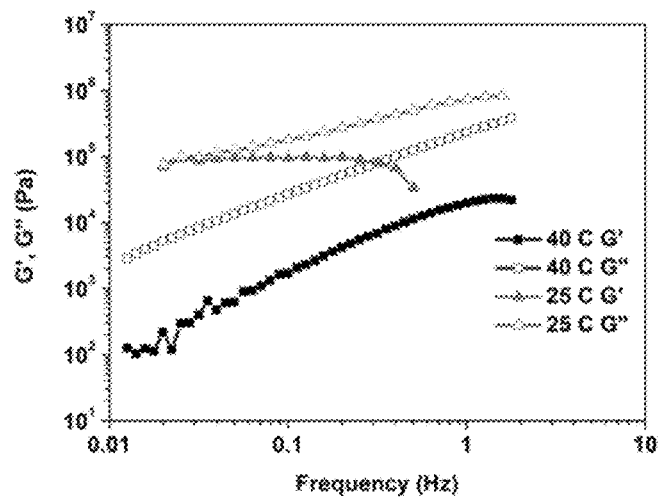
FIG. 46. Viscoelastic properties of virgin material at room temperature and about 40° C. A G" higher than G' value is observed which is typical of a visco-elastic material. Note that the elastic (storage) modulus G' and viscous (loss) modulus G" values decreases significantly at elevated temperatures. This indicates that G":G' ratio is increased at higher temperatures, showing an increase in viscoelasticity of the material at higher temperatures.

To investigate electrical healing, the conductor was completely bifurcated using a scalpel, and the two fractured surfaces brought together. FIG. 26d describes the time evolution of a typical electrical healing process. Following complete severance of the self-healing conductor, an open circuit was formed. As the edges of the composite were brought into contact, the conductivity increased and the resistance dropped to several kilo-ohms. At this stage, the opposite halves of the bifurcated samples were not self-supporting. However, when a gentle pressure was applied for a duration of about 15 s, the conductivity returned to close to its initial value, and the composite became self-supporting. At release, a very slight increase in resistance was observed initially. This increase can be explained by the slight viscoelastic nature of the composite, which slightly increased the conduction path distance (FIG. 46). However, as the healing progressed, the resistance gradually decreased. As electrical conductivity is determined by the proximity of the filler particle, the re-association of the hydrogen bonds within the polymer at room temperature provides high electrical healing efficiencies by allowing the particles to be closely packed at the healing interface under gentle contact pressures (about 50 kPa, similar to the pressure applied to a minor cut wound on skin; FIG. 34).

Figure 35:
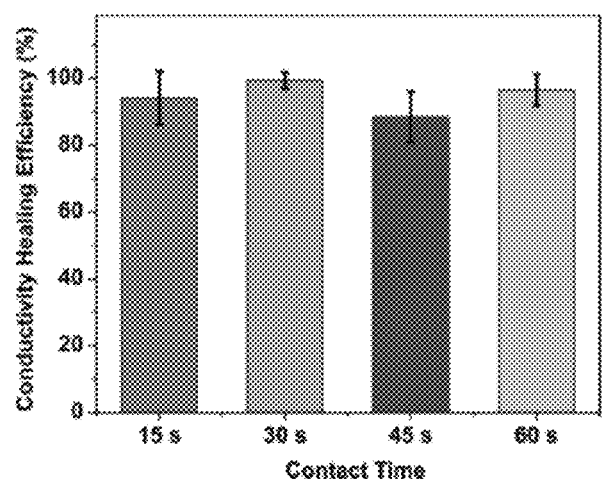
FIG. 35. Conductive healing efficiencies versus contact time. Three independent samples were tested, each cut and healed at the designated duration (about 15 s, about 30 s, about 45 s, and about 60 s), and for three times at the same location. Thus, a total of 12 cuts were performed per sample. The sample-to-sample variation in conductive healing is shown as s.d.

The conductive healing efficiency, $\eta_{elec}$, can be specified as the proportion of conductivity restored relative to the original conductivity. FIG. 26e shows that successive cuts at the same location were also healed with high $\eta_{elec}$, demonstrating excellent repeatable restoration of electrical performance in the self-healing electronic composite. The duration of contact can affect the determination of $\eta_{elec}$, indicating that mechanical healing contribute towards conductive healing. An about 15 s contact resulted in a nearly full restoration of the electrical properties, with $\eta_{elec}$ reaching as high as about 98% (FIG. 35). A battery-powered circuit was constructed to demonstrate further the potential of electromechanical self-healing for electronic circuits (FIG. 26f).

Mechanical Characterization of Self-Healing Composite

Figure 27:
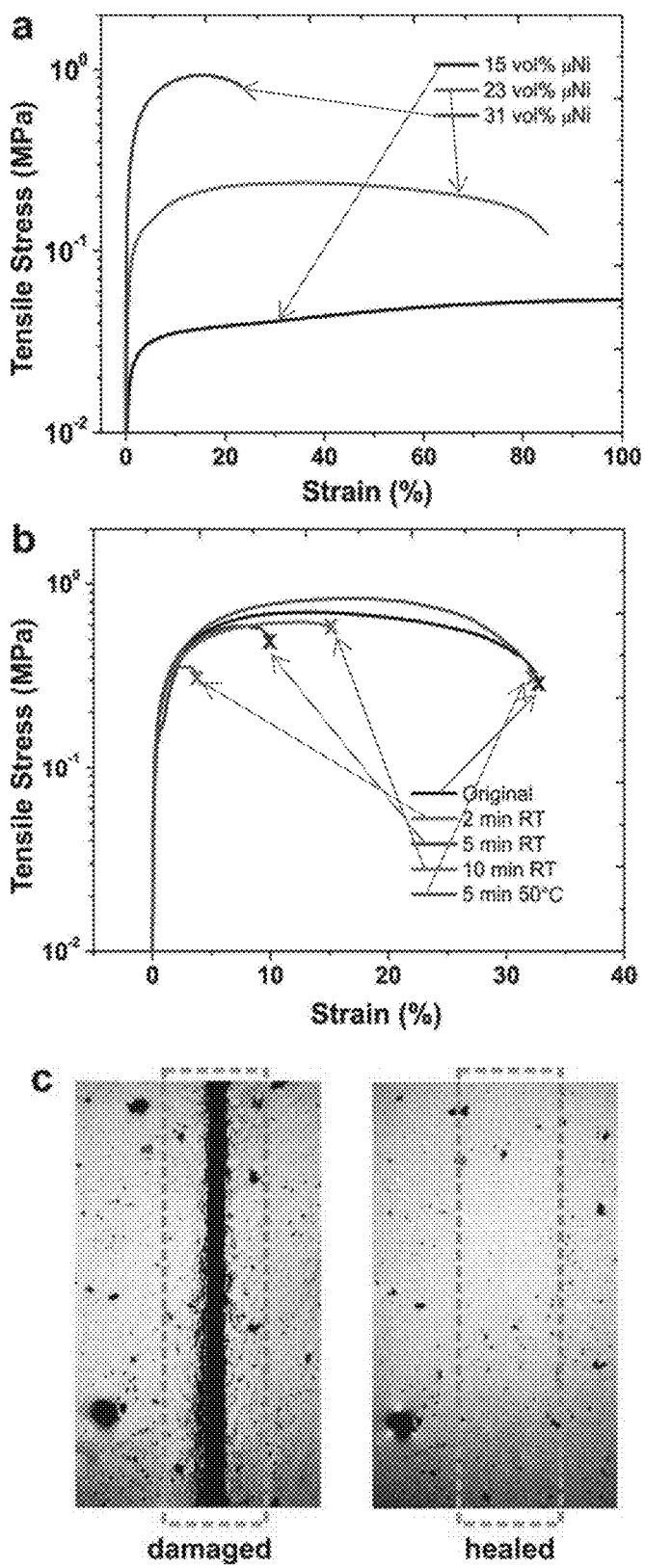
FIG. 27. Mechanical and healing efficiency characterization of a self-healing composite. a, Tensile measurements of composites with different nickel volume ratios. b, Typical stress-strain curves of original and healed samples for different healing times and temperature for about 31 vol % mNi composite. RT, room temperature. c, Optical microscope image of damaged sample and substantially complete scar healing for about 31 vol % mNi composite. Scale bar, 1 mm.

FIG. 27a shows that increasing the mNi particle concentration beneficially strengthens the polymer network and increases the Young's modulus and maximum tensile stress that the composite can withstand. Mechanical healing efficiencies can be quantified using toughness, because this takes into account the restoration of both stress and strain (area under the stress-strain curve). The mechanical healing efficiency $\eta_{mech}$ can be specified as the proportion of toughness restored relative to the original toughness. FIG. 27b shows representative stress-strain curves for a 31% nickel volume fraction composite under different healing conditions. From these curves, $\eta_{mech}$ was found to be a function of healing time. The longer the healing time, the higher the value of $\eta^{mech}$, as hydrogen bonds continue to re-associate with one another between the interfaces (FIG. 27b). Even at the highest nickel volume fraction of 31%, the toughness recovery of the composite increased by a factor of about three to about 41% after a healing time of about 10 min, compared to about 13% for about 5 min, at room temperature. The partially healed composite broke at the site of initial fracture, possibly due to remnant defects at the site. However, substantial full restoration of the toughness was achieved at a gentle heating temperature of about 50° C. for about 10 min, and the fully healed sample fractured at a different site upon tensile testing. The toughness recovery was higher than that of the original composite. For superficial damage, such as a scratch, the scar at the damaged interface could be substantially fully healed (FIG. 27c) after about 5 min at about 50° C.

Figure 36:
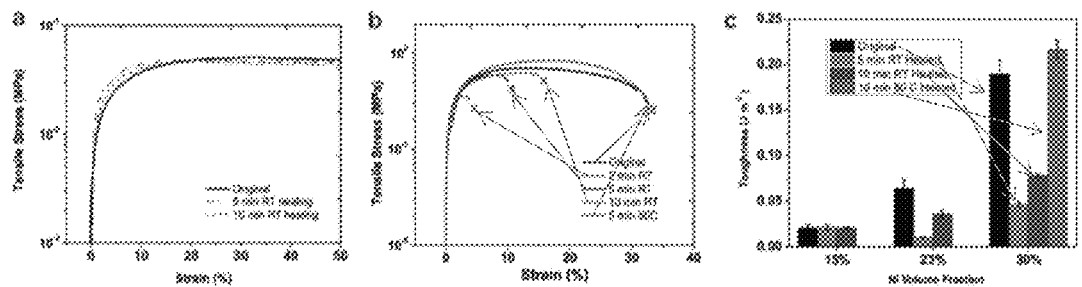
FIG. 36. Stress-strain curves of original and healed samples for a) about 15 vol % and b) about 31 vol % mNi concentration; RT: Room Temperature. c, Mechanical healing efficiencies for three concentrations of mNi: about 15 vol %, about 23 vol %, and about 31 vol %.
Figure 37:
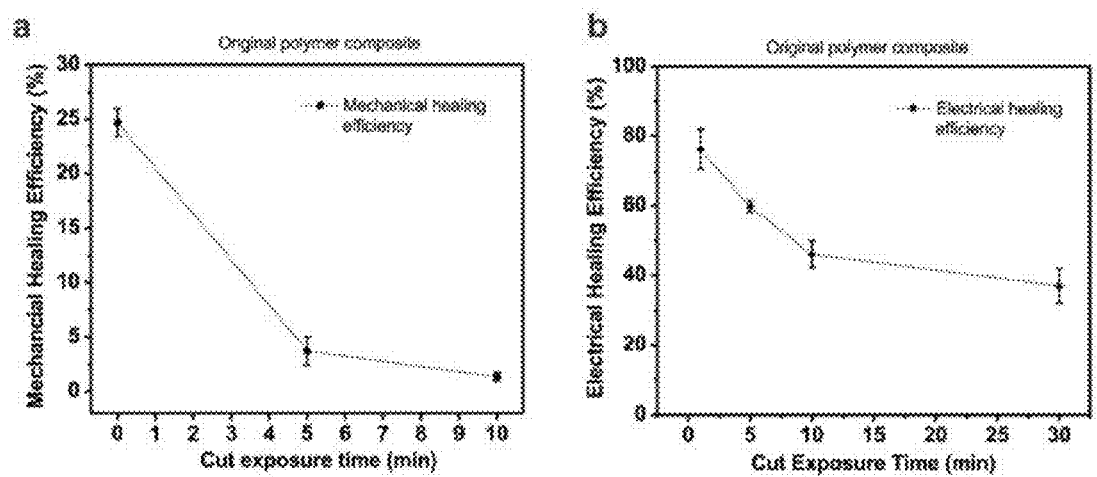
FIG. 37. Cut exposure dependence study of about 31 vol % original polymer composite. a, mechanical healing efficiency versus cut exposure time. b, electrical healing efficiency dependence on cut surface exposure time. Error bars show one s.d.

FIG. 36 presents a comparison of the mechanical healing efficiencies of a different nickel volume fraction using three samples at each composition. As the nickel particle concentration increased, $\eta_{mech}$ decreased, because part of the surface area of the fractured interface was now occupied by nickel particles. Both mechanical and electrical healing were also negatively affected if the interfaces were left in ambient air for over 2 min (FIG. 37). This can be attributed to a loss of hydrogen-bonding ability due to absorption of moisture from the ambient air, confirming that hydrogen bonding is the basis of the self-healing mechanism.

Figure 38:
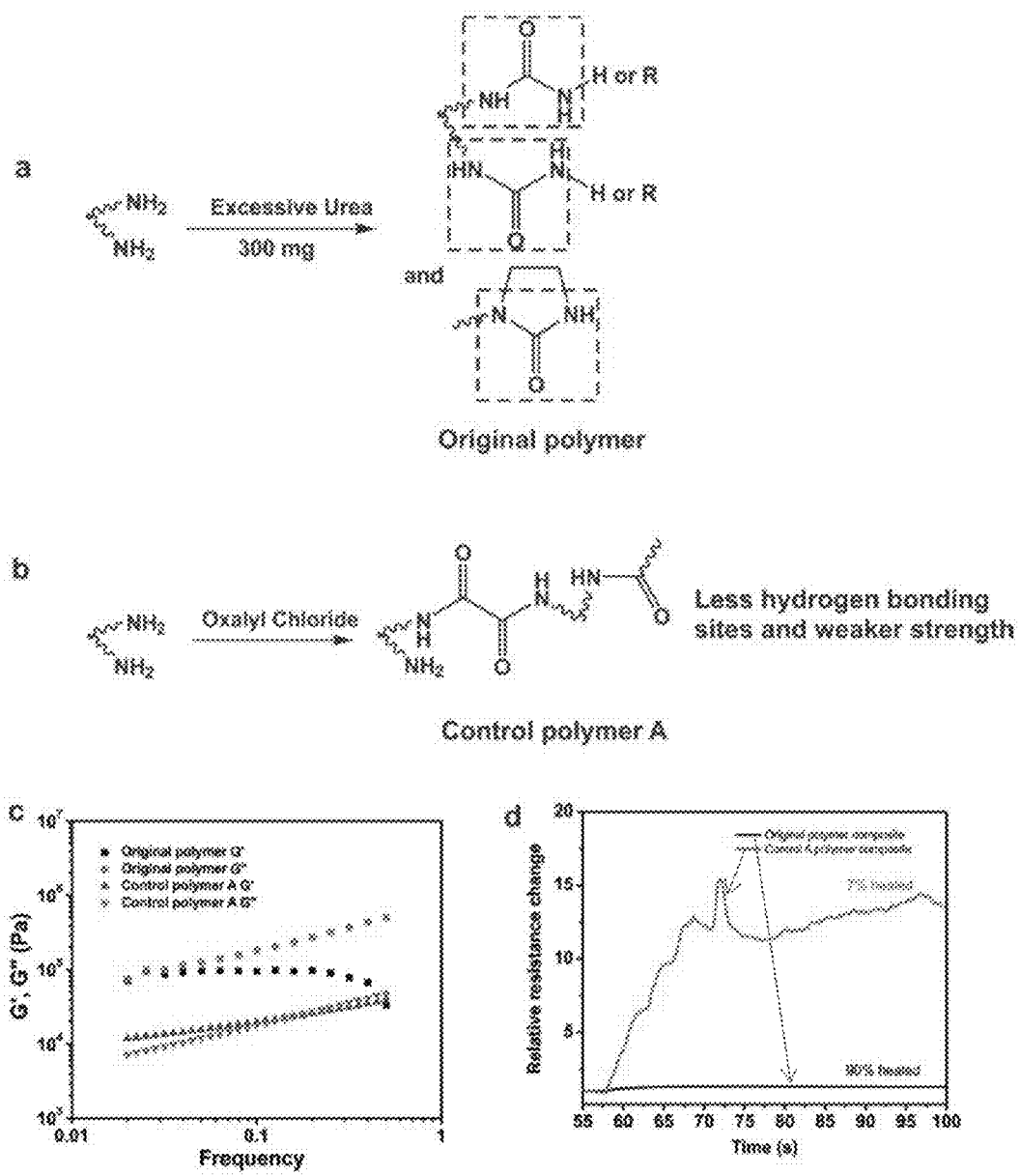
FIG. 38. Synthesis of control polymer with suppressed hydrogen bonding. a, Original self-healing polymer. b, control polymer A with significantly suppressed hydrogen bonding sites. c, rheological measurements of control polymer A that shows similar modulus values as original polymer. d, electrical healing efficiency of control polymer A is significantly lower than original polymer.
Figure 39:
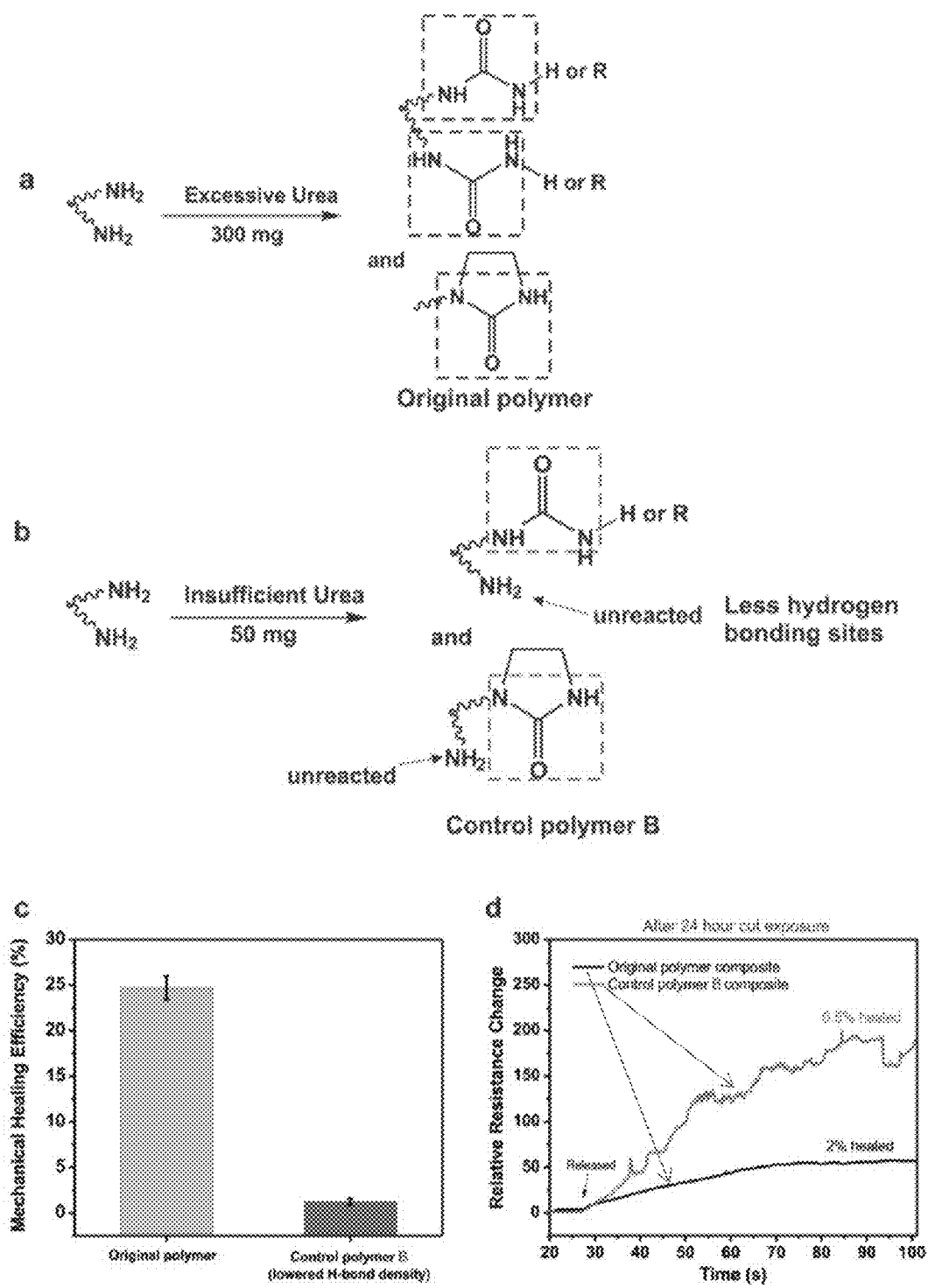
FIG. 39. Synthesis of decreased hydrogen bonding density control polymer B. a,b, Chemical structure of control polymer B. c, Mechanical healing efficiency comparison between original self-healing polymer composite and control polymer B composite. d, Healing efficiency after 24 hour cut exposure showing significantly reduced healing efficiency for control polymer B composite.
Figure 40:
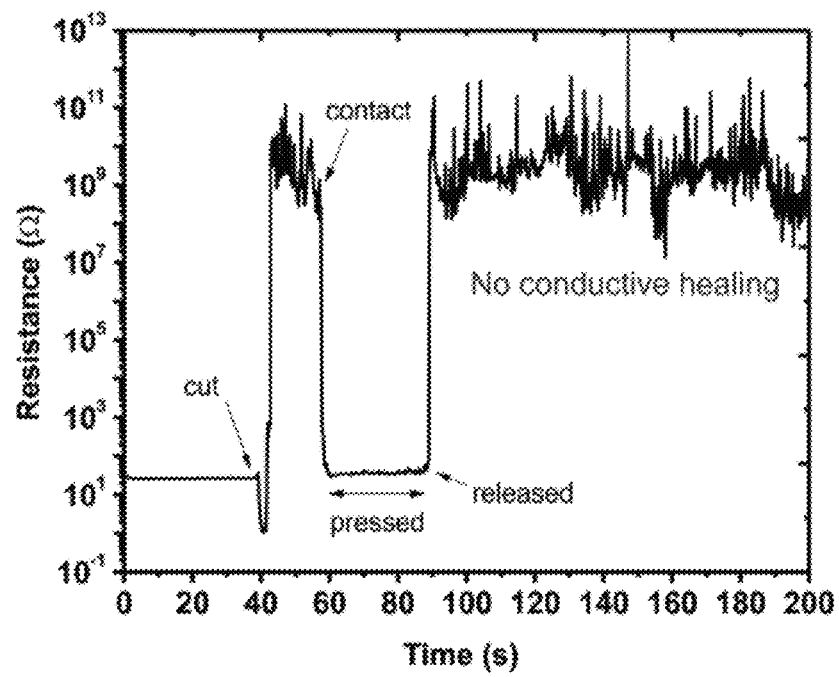
FIG. 40. The conductivity of PDMS loaded with about 31 vol % nickel particles. After cutting and releasing, no conductive healing is observed.

To further study the effect of hydrogen-bonding density on electrical and mechanical healing, a control polymer, composite A, was synthesized to have similar mechanical properties and Tg, but significantly fewer hydrogen-bonding sites (FIG. 38). This was achieved by using oxalyl chloride instead of urea, followed by loading the polymer with nanostructured mNi particles to obtain similar electrical conductivities. The control polymer electrically healed to about 7% of its original value, whereas the original polymer composite healed to about 90%, indicating the importance of proper tuning of the number of hydrogen-bonding sites and strength. Another control polymer, composite B, was also synthesized in which the hydrogen-bonding density was lowered by decreasing the amount of urea (FIG. 39). Control polymer B demonstrated reduced mechanical and electrical healing efficiencies, further indicating that hydrogen bonding was driving the healing. If there is no mechanical healing at the interface, the conductivity between fractured pieces may not be effectively restored once the pressure is released. For example, when a polymer such as PDMS without hydrogen bonding was used, electrical and mechanical self-healing were not observed (FIG. 40).

Self-Healing Composite as Electronic Skin

Figure 28:
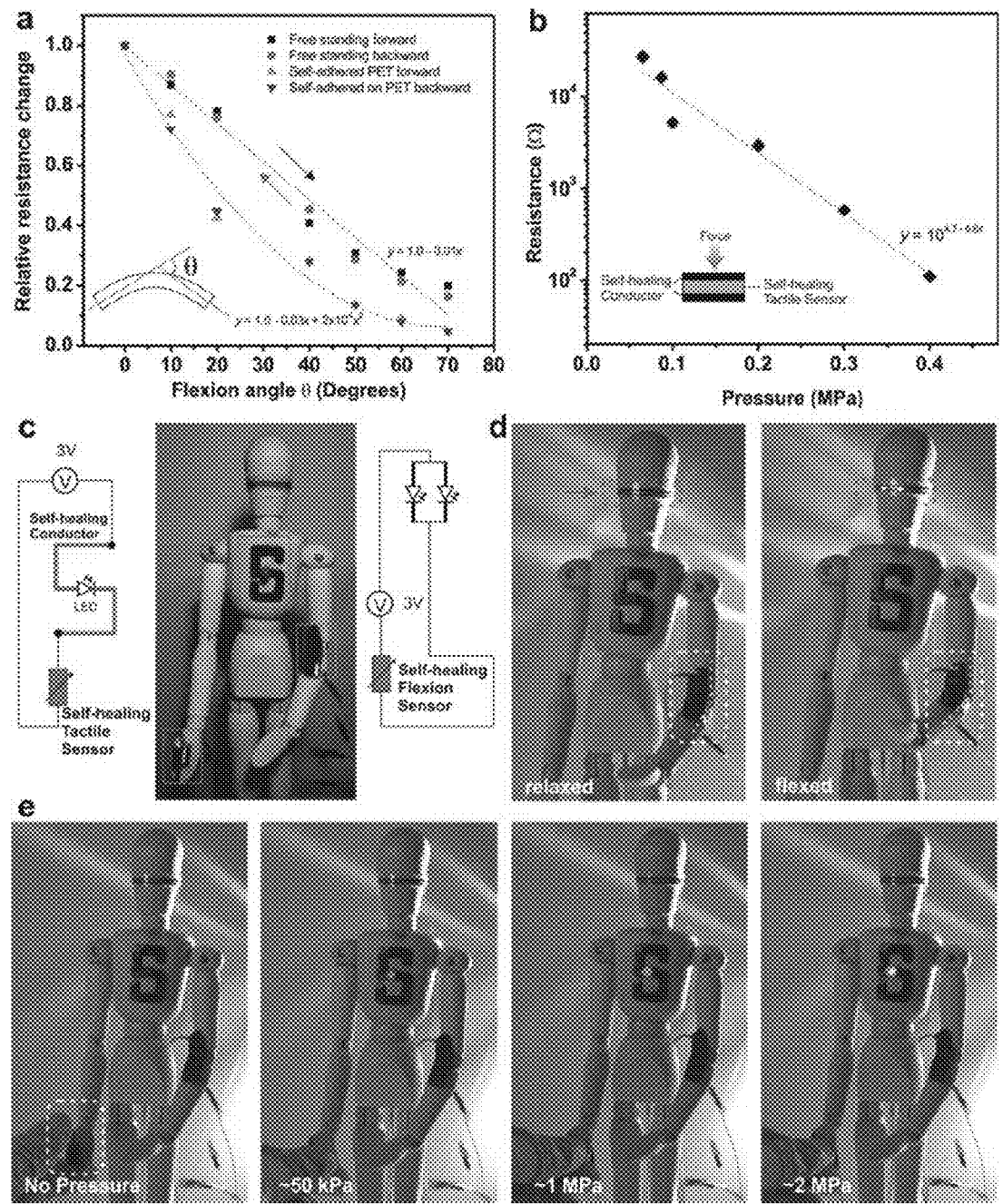
FIG. 28. Characterization and application of a self-healing electronic sensor skin. a, Flexion sensor electrical response in both free-standing and self-adhered modes on about 50-μm-thick PET substrates. Inset: definition of flexion angle θ. Equation represents least-squares fit (dotted line) relationship of resistance and flexion angle. b, Tactile sensor response at increasing peak pressure values (inset: sensor schematic). Equation represents least-squares fit relationship (dotted line) of resistance and applied pressure. c, Self-healing flexion and tactile sensor circuit schematic and mounting on a fully articulated wooden mannequin. A flexion sensor was mounted on the inner elbow region. A tactile sensor was mounted on the palm. LEDs (center of body and eye region) are used to transduce the mechanical deformation into visible analog light-intensity outputs. d, Flexion sensor circuit demonstration: LED 'eyes' light up after the elbow is bent. The intensity increases with increasing elbow flexion. e, Tactile sensor circuit demonstration. LED intensity responds as a function of increasing tactile pressure.

Using lower mNi concentrations, with the particles spaced further apart, self-healing piezoresistive sensors are realized. The larger particle spacing allows a more significant change in resistance as the compressive forces bring the mNi particles closer within the polymer matrix. Such piezoresistance is realized here with a supramolecular composite with dynamic healing. At mNi concentrations near the percolation threshold (about 15 vol %), the composite material can be used to sense mechanical forces such as a flexion (FIG. 28a) and a tactile pressure (FIG. 28b). When the composite material was flexed, compressive stresses built up at the inner curvature. The mNi particles therefore approached closer to one another and thereby reduced the composite's resistance. The greater the flexion angle θ (defined in FIG. 28a), the lower the resistance. The change in resistance was repeatable both in forward (increasing θ) and reverse (decreasing θ) directions. Electronic skins can be fabricated by mounting sensors or circuitry on flexible substrates such as PET sheets. The sensor was mounted on about 50-μm-thick PET, and a similar trend in response was found. The slight differences can be attributed to the different deformation modes taking place on a free-standing film versus a mounted film—in the case of a free-standing film, one side is compressed but the other side is stretched.

Figure 41:
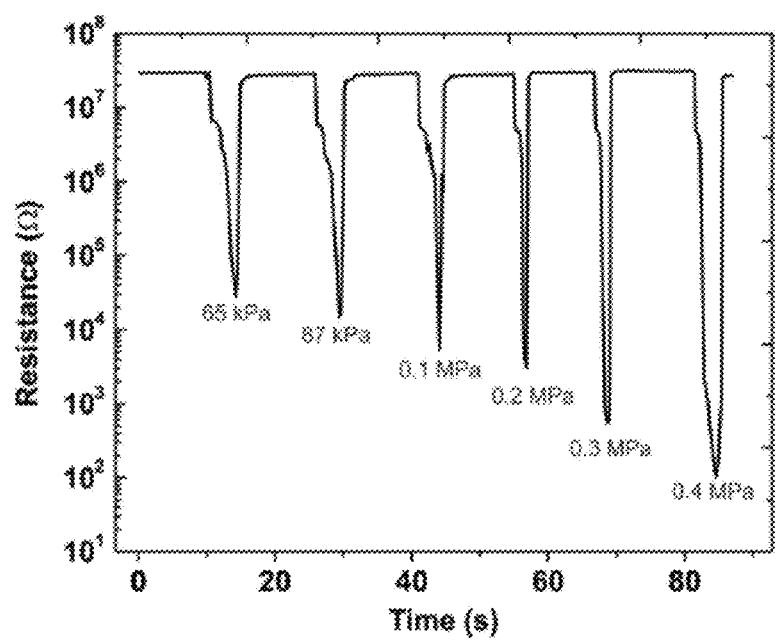
FIG. 41. Tactile sensor response at increasing peak pressure values by applying a ramped load.
Figure 42:
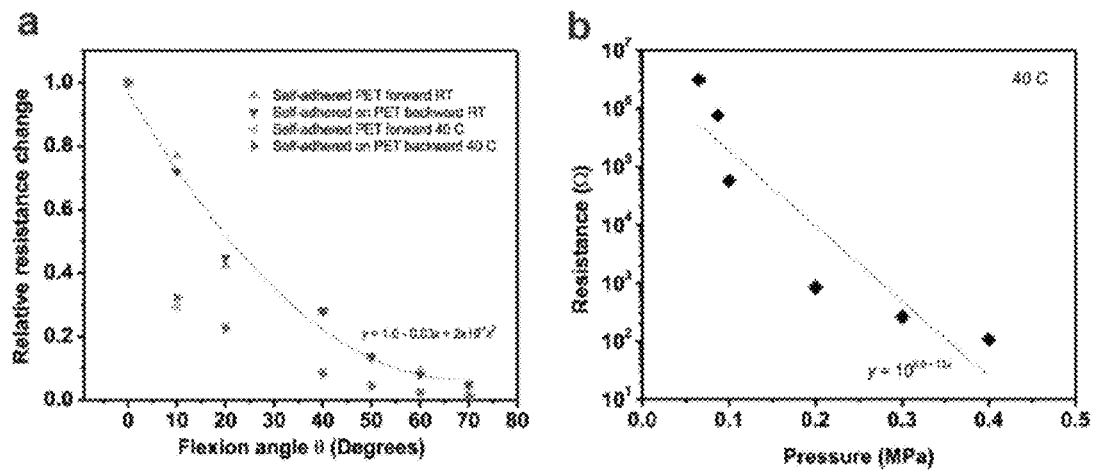
FIG. 42. Flexion and tactile sensor response at higher temperature of about 40° C. Equation represents least squares fit to the measured experimental data.

Similarly, a tactile sensor can be constructed from the self-healing materials by using a parallel-plate structure with the piezoresistive composite sandwiched between layers of the conductive composite. The piezoresistive response of this arrangement is shown in FIG. 28b. The increase in conductivity is exponentially dependent on stress, similar to other piezoresistive sensors based on carbon black. Although such dynamically healing polymer systems typically suffer from a viscoelastic effect (creep), which affects the time response to mechanical forces, the addition of nickel particles significantly reduces the viscous modulus, and the piezoresistive sensors can track mechanical loads without showing significant relaxation times, as shown by the tracking of various ramped loads in FIG. 41. The flexion and tactile sensors were then characterized at an elevated temperature of about 40° C. (FIG. 42). The sensitivities increased as a result of thermal expansion and a slight decrease in modulus at elevated temperatures.

Towards achieving the goal of using the self-healing composite as an electronic skin, the tactile and flexion sensors are integrated into a humanoid mannequin (FIG. 28c). The sensors were located on the palm and elbow joint in the path of electric circuits, using LEDs as indicators of mechanical forces. The ability to detect varying pressures and changes in the positions of the limbs is demonstrated (FIGS. 28d and e). The sensors modulated current flow through the sensor circuit by way of changes in their resistance depending on pressure and flexion angle of the limb. This in turn changed the intensity of the respective LEDs depending on the pressure and flexion angle. The flexibility of the material is advantageous for detecting the position of movable joints.

Conclusions

Figure 43:
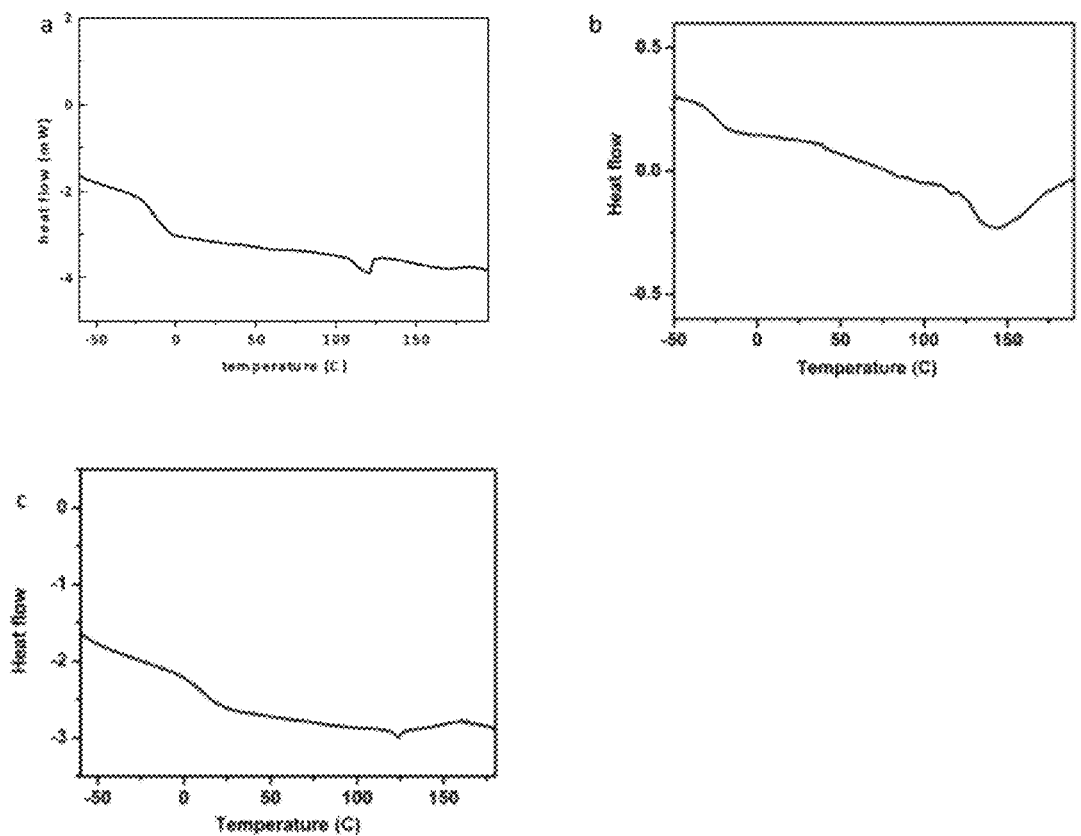
FIG. 43. DSC traces of (a) hydrogen bonding network, (b) Carbon black (about 31% vol.) and (c) Ni composites (about 31% vol.). The glass transition temperature of the host polymer is determined to be about −20° C. (b) The glass transition temperature using carbon black as filler is unchanged. (c) The glass transition temperature of Ni polymer composites was about 10° C. All the experiments were conducted at a heating rate of about 10° C./min under nitrogen atmosphere.

By way of summary, this example demonstrates an ambient repeatable self-healing electronic composite material that can be used to sense mechanical forces. Although the Tg of the polymer is about −20° C., the addition of mNi particles with nanostructured surfaces significantly enhances the mechanical properties and raises the glass transition temperature to about 10° C. (FIG. 43). Furthermore, mNi-composite samples have healing efficiencies that decrease with surface exposure time, indicative that healing is driven by hydrogen bonding re-association between the cut surfaces. Although the Tg of the composite can set the lower bound of the operating temperature range for efficient healing, as the polymer chains are less mobile at or below Tg, this can be overcome by tuning the mechanical properties of the supramolecular binder by controlling its crosslinking density and using multiple composite materials tuned to a different temperature operating range.

The self-healing composite is a bulk conductive composite that has an organic supramolecular polymer as host and inorganic metal particles with nanostructured morphology as fillers. The rate of electrical healing is rapid (within about 15 s). These functional self-healing electronic sensor skins potentially enhance the functional lifespan. Because they are electrically conducting, a damage event can be detected through a change in electrical resistance, and the skin can be repaired by contacting the fractured interfaces. The self-healing electronic skin demonstrated here represents one possible sensing functionality achievable with this supramolecular polymer system. It is contemplated that other self-healing polymer systems can also benefit from such a functional composite strategy to provide new electronic functionalities. It is contemplated that a bottom-up strategy of synergizing supramolecular interactions with carefully selected chemically compatible nano-inorganic fillers with desired electronic properties can yield a class of functional, self-healing electronic devices ranging from passive resistors and capacitors to electroactive sensor devices such as semiconductors, solar cells, and artificial soft actuators.

Methods

Figure 44:
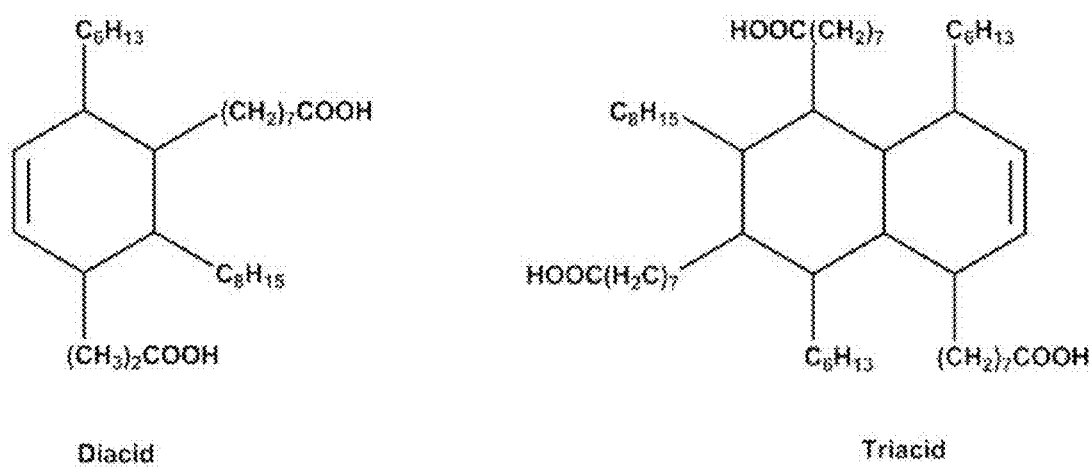
FIG. 44. Chemical structures of components of EMPOL 1016, which is a mixture of about 80 wt % diacids and about 16 wt % triacids.
Figure 45:
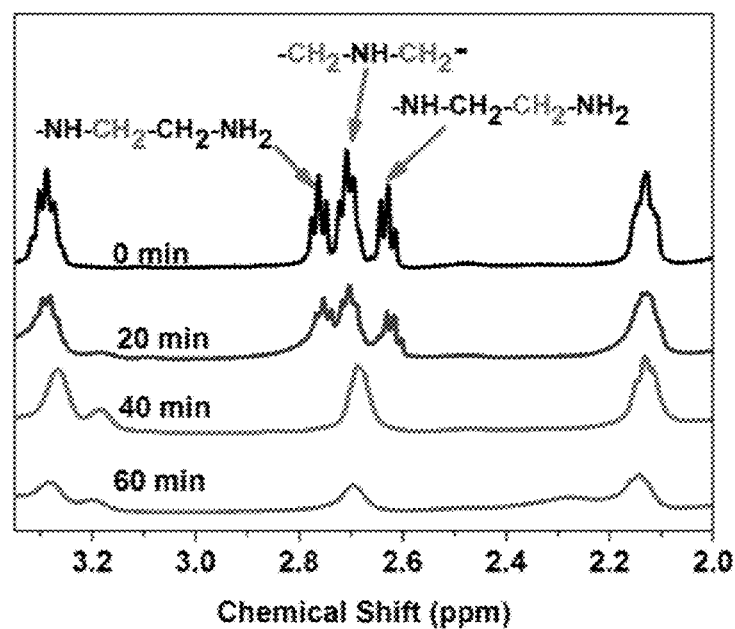
FIG. 45. 600 MHz $^1$H NMR spectrum of the reaction between a randomly branched polymer and urea at different reaction time. At about 40 minutes, substantially all the primary amines are converted into amide while the secondary amines are still present.
Figure 47:
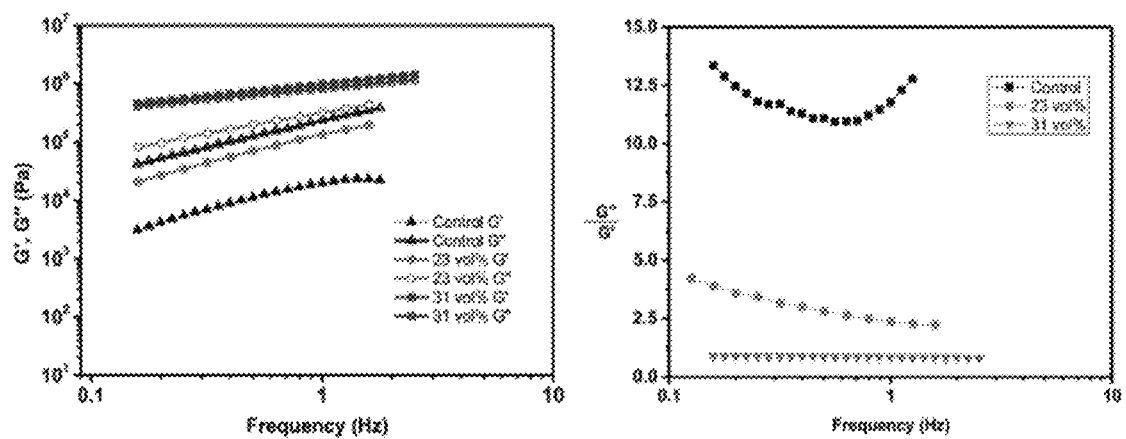
FIG. 47. Comparison of Ni-filled composite versus control without any Ni particles. Note that the rheological measurement was done at about 40° C. because the material was relatively solid at room temperature (25° C.). The G":G' ratio shows a marked decrease, namely G':G" ratio increases as Ni volume fraction is increased, which indicates that there is an increase in elasticity.
Figure 48:
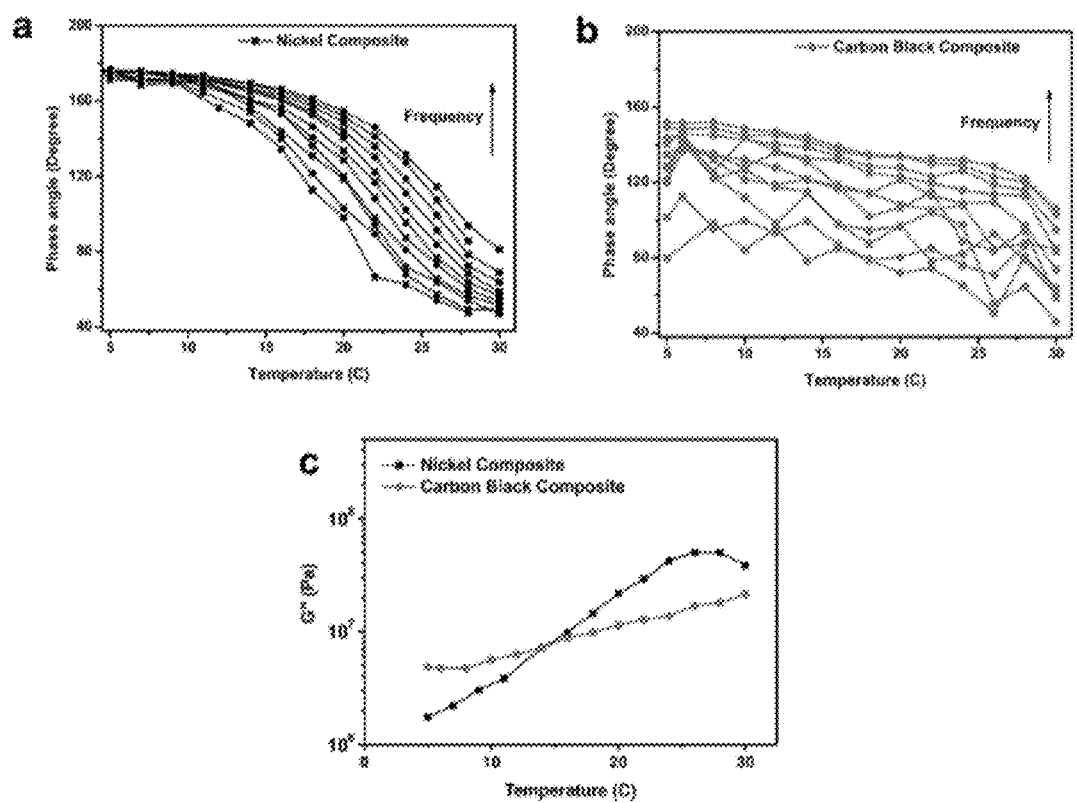
FIG. 48. Rheometric analysis of nickel composite with carbon black composite. a, Phase angle comparison of nickel composite and b, carbon black composite at different temperatures. c, Loss modulus G" (1 Hz) comparison of nickel composite and carbon black composite at different temperatures.

Composite Manufacture:

The synthesis of the supramolecular hydrogen-bonding network is modified to provide plasticizer-free synthesis by lowering the density of hydrogen bonding to obtain the supramolecular hydrogen bonding network with Tg<0° C. (FIG. 43). A mixture of about 41.5 g Empol 1016 (donated by Congnis, about 80 wt % diacids, about 16 wt % triacids, FIG. 44) and about 17 g diethylenetriamine (DETA, Sigma Aldrich) was stirred continuously at about 160° C. for about 24 h under an argon atmosphere. The product was then dissolved in about 150 ml chloroform followed by washing with about 150 ml water and about 75 ml methanol, and vacuum removal of chloroform. The oligomer was dissolved in about 1 ml of chloroform and then mixed with mNi particles (Novamet) using a Dual Asymmetric Centrifugal Mixer (Flacktek) (about 3,500 r.p.m., about 135 s) to obtain a homogeneous suspension. The suspension was then reacted with about 300 mg urea (Sigma Aldrich) at about 135° C. under constant mechanical stirring. The reaction between the initial random branched oligomer and urea was controlled at about 40 min so that substantially only the primary amines were converted into amides (FIG. 45). Beyond about 40 min, the composite material became brittle and inflexible. The product was then compression-molded (about 100° C.) to about 1.5-mm-thick sheets using Teflon molds. The addition of mNi strongly enhances the mechanical properties, as demonstrated by the increased Tg (FIG. 43) and rheological measurements (FIGS. 46-48). In contrast, carbon black composites do not show an increase in Tg at tested volume ratios due to the lack of a strong interaction with the polymer matrix. Furthermore, multi-walled carbon nanotube (MWNT)-based composites demonstrated reduced electrical performance, despite their high intrinsic conductivity, due to bundling of the MWNTs in the polymer host.

Synthesis of Control Composite A:

A randomly branched oligomer (M-NH$_2$, about 1.5 g) was dissolved in about 3 ml of dichloromethane, and about 0.3 ml of triethylamine was added. Oxalyl chloride (about 1 mmol) was then added to the mixture, dropwise, under vigorous stirring. After reaction for a further period of about 1 h, the dispersion was mixed with nickel particles. The resulting slurry was heated at about 135° C. for about 10 min to remove solvents, followed by compression molding into samples for characterization.

In the supramolecular self-healing composite system, the hydrogen bonding sites primarily come from the amide groups and the urea groups. Urea groups can form strong bifurcated hydrogen bonds, in which two hydrogen atoms bounded to a nitrogen are hydrogen bonded to the same C═O oxygen atom, as shown in FIG. 25a. The hydrogen bonding strength of urea groups (about 20 kJ/mol) is much higher than that of amide groups (about 5 kJ/mol). As a result, urea groups, which can play a dominating role, are responsible as the efficient hydrogen bonding sites in the self-healing polymer.

To synthesize a control polymer with similar mechanical strength, but less hydrogen bonds compared to the self-healing polymer, the randomly branched polymer terminated with amine groups (M-NH$_2$)—the product of the reaction from Empol and DETA—is used as the starting material. The synthesis of the original self-healing polymer proceeds by reacting M-NH$_2$ with an excessive amount of urea to turn substantially all the primary amine groups into urea groups, including alkyl urea groups and a relatively small amount of cyclic urea groups (imidazolidone) according to the NMR analysis. Therefore, urea groups are introduced into the self-healing random branched polymer to provide efficient hydrogen bonding sites. On the contrary, to make a control polymer with less hydrogen bonding sites, M-NH$_2$ is reacted with a small amount of oxalyl chloride (about 0.8 mmol to about 1.5 g of M-NH) to form control polymer A. In this way, the control polymer formed a similar random branched polymer as the self-healing polymer to provide the desired mechanical property, but with much less hydrogen bonding sites and strength. It is further determined that the Tg of this polymer is about 0° C. using DSC, similar with the original self-healing polymer. Moreover, the rheological measurements showed similar modulus values as the original polymer.

The control polymer A is loaded with nanostructured mNi particles to obtain similar electrical conductivities as the original polymer composite. The electrical healing process from freshly cut samples of the original polymer composite and the control polymer A composite was evaluated. Upon releasing the pressure, control polymer A composite healed by about 7% compared to about 90% of the original polymer composite. This demonstrates that a sufficient number of hydrogen bonding density is the basis for high electrical healing efficiencies.

Synthesis of Control Composite B:

The synthesis is similar to that for the self-healing composite A, but the urea content was reduced to about 50 mg (compared to about 300 mg for original polymer) for every about 1.5 g of M-NH$_2$. In order to synthesize the self-healing polymer with lower hydrogen bonding density, an insufficient amount of urea was used as a reactant. In this case, about 25% of the amine groups are reacted into urea groups. As a result, a fraction of the amine groups are reacted into urea groups, and the hydrogen bonding density is markedly lower. As shown in FIG. 39, compared to the original polymer composite, control polymer B composite has a markedly reduced mechanical healing efficiency for about 5 minute healing of freshly cut surfaces. FIG. 39 also shows the electrical healing efficiencies after exposing the cut surface for about 24 h.

Mechanical Testing:

Mechanical tensile-stress experiments were performed using an Instron 5848 Microtester according to ASTM D638 normalized samples. Three samples were tested for each volume fraction. Tensile experiments were performed at room temperature (about 25° C.) at a strain rate of about 1 mm min$^{-1}$. Healing experiments were performed at room temperature by bringing severed samples together and pressing with a hand pressure of about 50 kPa. Rheological experiments were carried out using a stress-controlled rheometer (TA Instruments Model AR-G2) with a parallel plate attachment (about 40 mm). The gap was at least about 110 µm for each sample. Oscillatory experiments were carried out with the frequency varied from about 0.01 to about 10 Hz while maintaining the strain at about 1%. Frequency sweeps from about 0.1 to about 1 Hz at about 0.1% strain were performed at temperatures between about 30 and about 0° C. Increments of about 2° C. were used with about 1 min equilibration.

Electrical Testing:

Current-voltage measurements were performed using a Keithley 2400 source meter. All conductivity measurements were performed on about 3-mm-thick samples cut to about 5 mm×about 15 mm, using four-point probe measurements. Two-point probes were used to measure resistance variation across samples (FIG. 30). The conductivity measurements in FIG. 30 were obtained from four-point probe measurements to eliminate contact resistance. Using two point probes, from the slope of the graph, the conductivity can be determined without contact resistance as discussed in the following. Given that R=ρ·(L/A), where R is resistance, ρ is resistivity, L is distance, and A is cross-sectional area of the sample, and given that conductivity σ=1/ρ, the conductivity can be determined from the slope of the graph. The slope was found to be about 0.5 Ωcm$^{-1}$ by performing a linear least squares fit shown by the dotted line, and cross-section was about 0.15 cm$^2$, which gave a conductivity of about 13 S cm$^{-1}$.

For low-conductivity samples, for the control sample (without nickel) and for samples below the percolation threshold, the resistance was obtained using an Agilent E4980A Precision LCR meter. Samples were connected with patterned flexible copper-clad polyimide films (thickness, about 12 µm; Dupont). Tactile sensor cycling measurements were performed on a mechanized z-axis stage (Newmark Systems, 0.1 µm resolution), and a force gauge (Mark 10) was used to apply loads to the sensor pads on a custom-built probe station. Photographic images of increasing LED intensity were taken at the same aperture and exposure settings.

Percolation Theory:

Percolation theory was used to generate the simulated curve in FIG. 26b, using the equation $\sigma = k(f-f_c)^n$, where $\sigma$ is the conductivity, k is a linear proportionality constant, f is the volume fraction, $f_c$ is the critical volume fraction at percolation, and n is a fitting exponent. The critical volume fraction $f_c$ can be influenced by particle size, shape, and morphology. A least squares regression fit on the measured data was performed to find k, the linear proportionality constant and n, the fitting exponent. The least squares fit was performed by first linearizing the above equation to $\log(\sigma) = \log(k) + n \cdot \log(f-f_c)$. k and n can be determined from the y-intercept and slope of the fitted curve respectively. The best-fit curve was obtained by taking $f_c = 0.15$ as this is where the composite conductivity shows the most abrupt change. Using this method, it is found that k is about 340 and n is about 2 (in agreement with critical conduction behavior in composites near percolation, where n=1.6-2.0).

Additional Characterization:

FIG. 47 shows a comparison of Ni-filled composite versus control without any Ni particles. Note that the rheological measurement was done at about 40° C. because the material was relatively solid at room temperature (25° C.). The G":G' ratio shows a marked decrease, namely G':G" ratio increases as Ni volume fraction is increased, which indicates that there is an increase in elasticity. FIG. 48 shows rheometric analysis of nickel composite with carbon black composite.

The rheological measurements showed that the control sample was viscoelastic (FIG. 46) with G" greater than G', where G" represents viscous modulus and G' represents elastic modulus. With increasing nickel concentration, the elasticity of the composite increased as indicated by the increase in G':G" ratio (FIG. 47), which indicates that the addition of nickel particles increases the elasticity of the material. The rheological data of the mNi composite in FIG. 48 corroborated with the increase in Tg for nickel composites compared to carbon black composites as shown by FIG. 43 using DSC.

Table 1 below sets forth results of conductivity measurements, and Table 2 below sets forth results of electrical healing experiments.

TABLE 1

| Concentration of nickel particles (vol %) | Sample size, n | Mean conductivity (S cm$^{-1}$) | Standard Deviation |
|---|---|---|---|
| 0.07 | 6 | 3.14 × 10$^{-8}$ | 1.23 × 10$^{-8}$ |
| 0.13 | 6 | 1.15 × 10$^{-7}$ | 5.78 × 10$^{-8}$ |
| 0.15 | 6 | 4.37 × 10$^{-6}$ | 2.99 × 10$^{-6}$ |
| 0.16 | 6 | 0.055 | 0.0355 |
| 0.17 | 6 | 0.28 | 0.272 |

TABLE 1-continued

| Concentration of nickel particles (vol %) | Sample size, n | Mean conductivity (S cm$^{-1}$) | Standard Deviation |
|---|---|---|---|
| 0.20 | 6 | 0.38 | 0.310 |
| 0.23 | 6 | 2.20 | 0.968 |
| 0.27 | 6 | 4.69 | 2.20 |
| 0.31 | 6 | 18.2 | 13.1 |

TABLE 2

| Healing time | Sample size, n | Mean healing efficiency (%) | Standard Deviation |
|---|---|---|---|
| 15 | 3 | 94.2 | 8.0 |
| 30 | 3 | 99.4 | 2.5 |
| 45 | 3 | 88.5 | 7.7 |
| 60 | 3 | 96.6 | 4.7 |

As used herein, the singular terms "a," "an," and "the" include plural referents unless the context clearly dictates otherwise. Thus, for example, reference to an object can include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±5%, such as less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "nanometer range" or "nm range" refers to a range of dimensions from about 1 nm to about 1 µm. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 µm.

As used herein, the term "micrometer range" or "µm range" refers to a range of dimensions from about 1 µm to about 1 mm. The µm range includes the "lower µm range," which refers to a range of dimensions from about 1 µm to about 10 µm, the "middle µm range," which refers to a range of dimensions from about 10 µm to about 100 µm, and the "upper µm range," which refers to a range of dimensions from about 100 µm to about 1 mm.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, and nanoparticles.

As used herein, the term "nanowire" refers to an elongated nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the µm range, and an aspect ratio that is about 5 or greater.

As used herein, the term "nanotube" refers to an elongated, hollow nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 5 or greater.

As used herein, the term "nanoparticle" refers to a spherical or spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

As used herein, the term "microstructure" refers to an object that has at least one dimension in the μm range. A microstructure can have any of a wide variety of shapes, and can be formed of a wide variety of materials. Examples of microstructures include microwires, microtubes, and microparticles.

As used herein, the term "microwire" refers to an elongated microstructure that is substantially solid. Typically, a microwire has a lateral dimension (e.g., a cross-sectional dimension in the form of a width, a diameter, or a width or diameter that represents an average across orthogonal directions) in the μm range, a longitudinal dimension (e.g., a length) in the μm range, and an aspect ratio that is about 5 or greater.

As used herein, the term "microtube" refers to an elongated, hollow microstructure. Typically, a microtube has a lateral dimension (e.g., a cross-sectional dimension in the form of a width, an outer diameter, or a width or outer diameter that represents an average across orthogonal directions) in the μm range, a longitudinal dimension (e.g., a length) in the μm range, and an aspect ratio that is about 5 or greater.

As used herein, the term "microparticle" refers to a spherical or spheroidal microstructure. Typically, each dimension (e.g., a cross-sectional dimension in the form of a width, a diameter, or a width or diameter that represents an average across orthogonal directions) of a microparticle is in the μm range, and the microparticle has an aspect ratio that is less than about 5, such as about 1.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A battery electrode, comprising:
   an electrochemically active material; and
   a binder covering the electrochemically active material and including a self-healing polymer including a polymeric matrix that includes molecules cross-linked together through reversible bonds,
   wherein the binder further includes conductive additives dispersed in the polymeric matrix,
   wherein the binder has an electrical conductivity of at least 0.1 S/cm.

2. The battery electrode of claim 1, wherein the reversible bonds have a bonding strength in the range of 4 kJ/mol to 100 kJ/mol.

3. The battery electrode of claim 1, wherein the reversible bonds are selected from at least one of hydrogen bonds, coordination bonds, electrostatic interactions, dynamic covalent bonds, π-π interactions, host-guest interactions, charge transfer interactions, or van der Waals interactions.

4. The battery electrode of claim 1, wherein the self-healing polymer has a glass transition temperature no greater than 75° C.

5. The battery electrode of claim 1, wherein the conductive additives provide an electrical pathway across at least a portion of the binder.

6. The battery electrode of claim 5, wherein a loading level of the conductive additives in the binder is above an electrical percolation threshold.

7. The battery electrode of claim 1, wherein the self-healing polymer is electrically conductive or semiconducting, and provides an electrical pathway across at least a portion of the binder.

8. The battery electrode of claim 1, wherein the binder has at least one of:
   an electrical conductivity of at least 1 S/cm; or
   an elongation-at-break of at least 50%.

9. The battery electrode of claim 1, wherein the binder has at least one of:
   a conductive healing efficiency of at least 40%; or
   a mechanical healing efficiency of at least 40%.

10. A battery comprising:
    an anode;
    a cathode; and
    an electrolyte disposed between the anode and the cathode,
    wherein at least one of the anode and the cathode corresponds to the battery electrode of claim 1.

11. A self-healing composite, comprising:
    a polymeric matrix that includes molecules cross-linked together through reversible bonds; and
    conductive additives dispersed in the polymeric matrix,
    wherein the self-healing composite has an electrical conductivity of at least 0.1 S/cm.

12. The self-healing composite of claim 11, wherein the electrical conductivity is at least 1 S/cm.

13. The self-healing composite of claim 11, wherein the self-healing composite has a glass transition temperature no greater than 25° C.

14. The self-healing composite of claim 11, wherein the reversible bonds have a bonding strength in the range of 4 kJ/mol to 100 kJ/mol.

15. The self-healing composite of claim 11, wherein the reversible bonds are selected from at least one of hydrogen bonds, coordination bonds, electrostatic interactions, dynamic covalent bonds, π-π interactions, host-guest interactions, charge transfer interactions, or van der Waals interactions.

16. The self-healing composite of claim 11, wherein each of the molecules includes a connecting moiety and multiple associative groups attached to the connecting moiety, and the molecules are cross-linked through their associative groups to form the polymeric matrix.

17. The self-healing composite of claim 16, wherein at least a portion of the connecting moiety includes an alkylene chain in the form of —(CH$_2$)$_n$— with n in the range of 1 to 40.

18. The self-healing composite of claim 16, wherein at least a portion of the connecting moiety includes one of a polyamide chain, a polyester chain, a polyurethane chain, and a polysiloxane chain.

19. The self-healing composite of claim 11, wherein the conductive additives include metallic nanoparticles having surface texturing.

20. The self-healing composite of claim 11, wherein each of the molecules includes an unsaturated hydrocarbon moiety.

* * * * *

UNITED STATES PATENT AND TRADEMARK OFFICE
CERTIFICATE OF CORRECTION

| | |
|---|---|
| PATENT NO. | : 9,490,045 B2 |
| APPLICATION NO. | : 14/075841 |
| DATED | : November 8, 2016 |
| INVENTOR(S) | : Chee Keong Tee et al. |

It is certified that error appears in the above-identified patent and that said Letters Patent is hereby corrected as shown below:

In the Specification

In Column 1, after the title "STATEMENT REGARDING FEDERALLY SPONSORED RESEARCH OR DEVELOPMENT," please replace the existing paragraph with the following paragraph:
--This invention was made with Government support under contract FA9550-12-1-0190 awarded by the Air Force Office of Scientific Research, under contract DE-AC02-76SF00515 awarded by the Department of Energy, and under contract DE-AC02-05CH11231 awarded by the Department of Energy. The Government has certain rights in the invention.--

Signed and Sealed this
Third Day of September, 2024

Katherine Kelly Vidal
*Director of the United States Patent and Trademark Office*